United States Patent
Saito

(10) Patent No.: US 11,928,881 B2
(45) Date of Patent: Mar. 12, 2024

(54) DETECTION DEVICE, DISPLAY DEVICE, DETECTION SYSTEM, AND DETECTION METHOD

(71) Applicant: Japan Display Inc., Tokyo (JP)

(72) Inventor: Hitoshi Saito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/101,250

(22) Filed: Jan. 25, 2023

(65) Prior Publication Data
US 2023/0162524 A1     May 25, 2023

Related U.S. Application Data

(63) Continuation of application No. PCT/JP2021/028410, filed on Jul. 30, 2021.

(30) Foreign Application Priority Data

Jul. 30, 2020    (JP) .................................. 2020-129655

(51) Int. Cl.
| | | |
|---|---|---|
| *G06V 40/13* | (2022.01) | |
| *G06F 3/041* | (2006.01) | |
| *G06F 3/044* | (2006.01) | |
| *G06F 21/32* | (2013.01) | |
| *G06V 40/12* | (2022.01) | |

(52) U.S. Cl.
CPC ........ *G06V 40/1306* (2022.01); *G06F 3/0412* (2013.01); *G06F 3/0447* (2019.05); *G06F 21/32* (2013.01); *G06V 40/1365* (2022.01)

(58) Field of Classification Search
CPC ............ G06V 40/1306; G06V 40/1365; G06F 3/0447; G06F 3/0412; G06F 21/32
See application file for complete search history.

(56) References Cited

U.S. PATENT DOCUMENTS

2018/0035923 A1*   2/2018   Kang ....................... G01B 7/28
2019/0325242 A1   10/2019   Wu

FOREIGN PATENT DOCUMENTS

| CN | 109582416 A | * | 4/2019 |
|---|---|---|---|
| JP | 2017138685 A | | 8/2017 |
| JP | 2017192176 A | | 10/2017 |

OTHER PUBLICATIONS

International Search Report of corresponding PCT application PCT/JP2021/028410, dated Sep. 28, 2021.

* cited by examiner

*Primary Examiner* — Stephen G Sherman
(74) *Attorney, Agent, or Firm* — K&L Gates LLP

(57) ABSTRACT

A detection device includes a sensor unit, a detector configured to receive an output from a sensor, a detection controller configured to drive and control the sensor unit and the detector, and a processor configured to perform processing in accordance with an output from the detector. The detection controller drives the sensor unit and the detector and determines a touch detection duration in which a coordinate of a finger contacting or nearby the sensor unit is detected, and a fingerprint detection duration in which a fingerprint image of the finger is detected.

16 Claims, 18 Drawing Sheets

DETECTION DEVICE, DISPLAY DEVICE, DETECTION SYSTEM, AND DETECTION METHOD

CROSS-REFERENCE TO RELATED APPLICATION

This application is a continuation of International Patent Application No. PCT/JP2021/028410 filed on Jul. 30, 2021 which designates the United States, incorporated herein by reference, and which claims the benefit of priority from Japanese Patent Application No. 2020-129655 filed on Jul. 30, 2020, incorporated herein by reference.

BACKGROUND

1. Technical Field

The present invention relates to a detection device, a display device, a detection system, and a detection method.

2. Description of the Related Art

In recent years, a detection device so-called a touch panel, which is capable of detecting an external nearby object, is provided with a fingerprint sensor in some cases. For example, a configuration that achieves both touch detection and fingerprint detection through a capacitive scheme has been disclosed (refer to Japanese Patent Application Laid-open Publication No. 2017-192176, for example). In the fingerprint detection, the shape of a fingerprint of a finger contacting a detection device is detected by detecting capacitance change according to concavity-convexity of the fingerprint. Thus, electrodes used for the fingerprint detection have smaller areas than those used for a hand or finger detection.

Fingerprint detection used for personal authentication and the like is typically performed at the timing of fingerprint acquisition request from a host device of an apparatus on which a touch sensor is mounted. The host device performs fingerprint acquisition request again depending on a result of the authentication (for example, when the authentication has failed). The authentication is highly likely to fail when a finger is moving (for example, a user is performing swipe operation) at the timing of fingerprint acquisition request from the host device. This leads to authentication ratio decrease and a time loss, and authentication accuracy potentially decreases.

The present invention is intended to provide a detection device, a display device, a detection system, and a detection method that can improve authentication accuracy.

SUMMARY

A detection device according to an embodiment of the present disclosure includes a sensor unit, a detector configured to receive an output from a sensor, a detection controller configured to drive and control the sensor unit and the detector, and a processor configured to perform processing in accordance with an output from the detector. The detection controller drives the sensor unit and the detector and determines a touch detection duration in which a coordinate of a finger contacting or nearby the sensor unit is detected, and a fingerprint detection duration in which a fingerprint image of the finger is detected, the detector alternately executes detection of the coordinate of the finger in the touch detection duration and detection of the fingerprint image in the fingerprint detection duration, and the processor sequentially acquires the coordinate of the finger and the fingerprint image from the detector, calculates a difference value between the coordinates of the finger that are detected in the touch detection durations before and after the fingerprint detection duration in which each fingerprint image is acquired, holds the acquired fingerprint image when the difference value is equal to or smaller than a predetermined value, and discards the acquired fingerprint image when the difference value is larger than the predetermined value.

A display device according to an embodiment of the present disclosure includes the detection device above, and a display panel provided with a display region for displaying an image, the display region overlapping a detection region of the detection device.

A detection system according to an embodiment of the present disclosure includes a detection device configured to determine a touch detection duration in which a coordinate of a finger contacting or nearby a sensor unit is detected and a fingerprint detection duration in which a fingerprint of the finger is detected, and a control circuit configured to perform processing in accordance with an output from the detection device. The detection device alternately determines the touch detection durations and the fingerprint detection durations, and the control circuit acquires a fingerprint image in each fingerprint detection duration, calculates a difference value between the coordinates of the finger detected in the touch detection durations before and after the fingerprint detection duration in which the fingerprint image is acquired, holds the acquired fingerprint image when the difference value is equal to or smaller than a predetermined value, and discards the acquired fingerprint image when the difference value is larger than the predetermined value.

A detection method according to an embodiment in which a touch detection duration in which a coordinate of a finger contacting or nearby a sensor unit is detected and a fingerprint detection duration in which a fingerprint of the finger is detected are alternately provided is disclosed. The detection method includes acquiring a fingerprint image in the fingerprint detection duration, calculating a difference value between the coordinates of the finger detected in the touch detection durations before and after the fingerprint detection duration in which the fingerprint image is acquired, holding the acquired fingerprint image when the difference value is equal to or smaller than a predetermined value, and discarding the acquired fingerprint image when the difference value is larger than the predetermined value.

A detection device according to an embodiment of the present disclosure includes a sensor unit, a detector configured to receive an output from a sensor, a detection controller configured to drive and control the sensor unit and the detector, and a processor configured to perform processing in accordance with an output from the detector. The detection controller drives the sensor unit and the detector and determines a coordinate detection duration in which a coordinate of a detection target body contacting or nearby the sensor unit is detected, and a surface information detection duration in which a concavity-convexity pattern on the surface of the detection target body is detected, the detector alternately executes detection of the coordinate of the detection target body in the coordinate detection duration and detection of the concavity-convexity pattern in the surface information detection duration, and the processor acquires the coordinate of the detection target body and the concavity-convexity pattern from the detector, calculates a difference value between the coordinates of the detection target body detected in the coordinate detection durations before and after the surface information detection duration in which the concavity-convexity pattern is acquired, holds the acquired concavity-convexity pattern when the difference value is equal to or smaller than a predetermined value, and discards the acquired concavity-convexity pattern when the difference value is larger than the predetermined value.

DETAILED DESCRIPTION

Aspects (embodiments) of the present invention will be described below in detail with reference to the accompanying drawings. Contents described below in the embodiments do not limit the present invention. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the invention is contained in the scope of the present invention. For clearer description, the drawings are schematically illustrated for the width, thickness, shape, and the like of each component as compared to an actual aspect in some cases, but the drawings are merely exemplary and do not limit interpretation of the present invention. In the present specification and drawings, any element same as that already described with reference to an already described drawing is denoted by the same reference sign, and detailed description thereof is omitted as appropriate in some cases.

Figure 1:
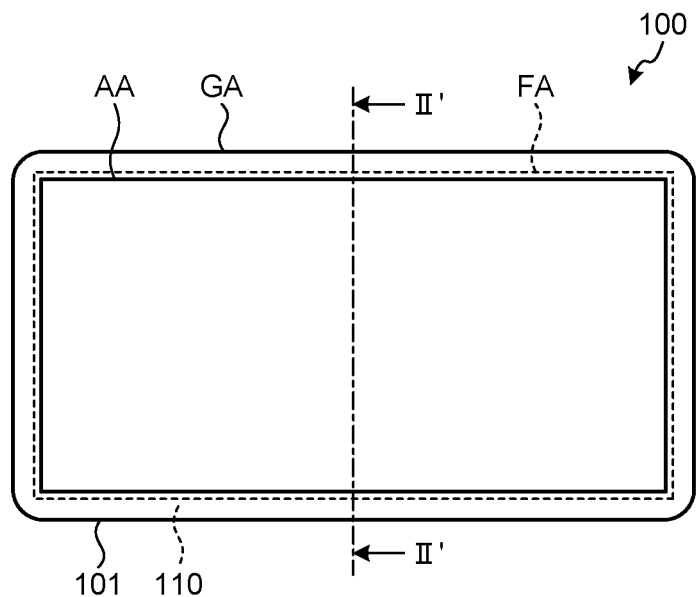
FIG. 1 is a plan view of a display device including a detection device according to an embodiment.
Figure 2:
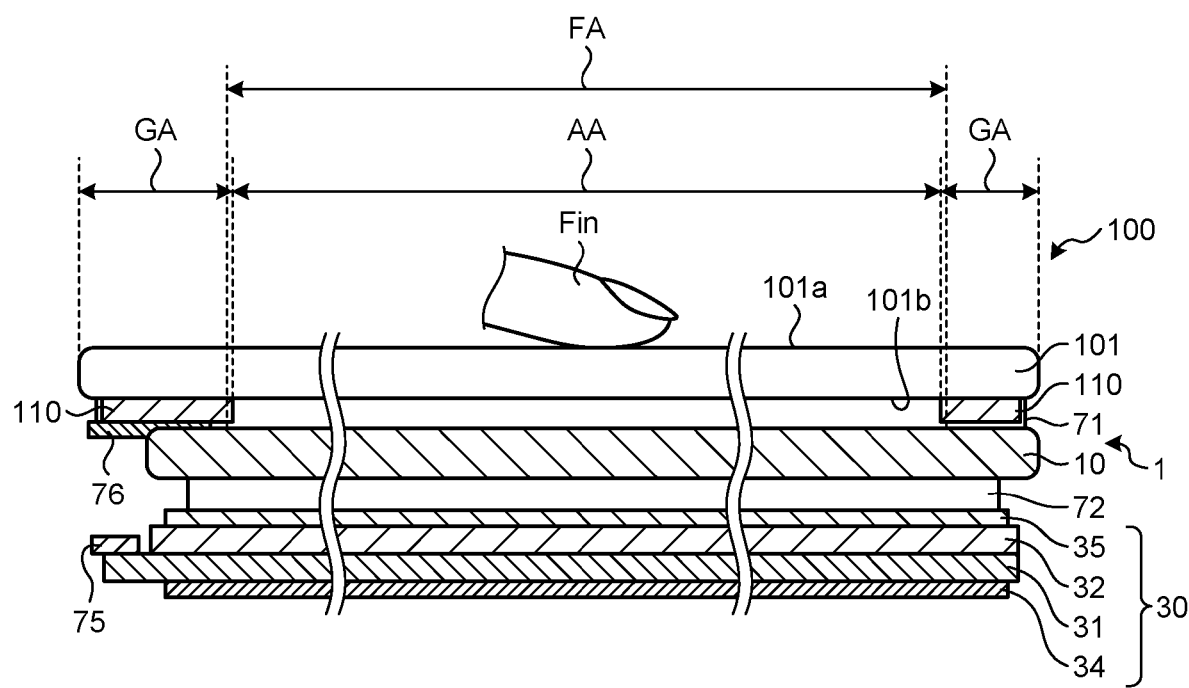
FIG. 2 is a sectional view taken along line II-II' in FIG. 1.

FIG. 1 is a plan view of a display device including a detection device according to an embodiment. FIG. 2 is a sectional view taken along line II-II' in FIG. 1. As illustrated in FIGS. 1 and 2, this display device 100 of the present embodiment includes a display region AA, a frame region GA, and a detection region FA. The display region AA is a region in which an image on a display panel 30 is displayed. The frame region GA is a region outside the display region AA. The detection region FA is a region in which concavity-convexity of the surface of a contacting or nearby finger or the like is detected. The detection region FA is provided over the entire display region AA.

As illustrated in FIG. 2, the display device 100 of the present embodiment includes a cover member 101, a detection device 1, and the display panel 30. The cover member 101 is a plate member having a first surface 101a and a second surface 101b opposite the first surface 101a. The first surface 101a of the cover member 101 is a detection surface of the detection device 1, and when a detection target body contacts the detection surface, the two-dimensional coordinate position of the detection target body on the detection surface and concavity-convexity of the surface of the detection target body are detected. In the present embodiment, the detection target body is a finger of a user, and the concavity-convexity of the surface of the detection target body includes a fingerprint. Although the detection target body is a finger in the following description, the detection target body may be another site on the body of the user, such as a palm or a sole in place of a finger. In this case, the surface concavity-convexity (concavity-convexity pattern) is a dermatoglyphic pattern of the other site, such as a palm print, a sole print, or a toe print.

The first surface 101a of the cover member 101 is a display surface on which an image on the display panel 30 is displayed, and also serves as an observation surface on which the user observes the image. The display panel 30 and a sensor unit 10 of the detection device 1 are provided to the second surface 101b side of the cover member 101. The cover member 101 is a member for protecting the sensor unit 10 and the display panel 30 and provided over the sensor unit 10 and the display panel 30. The cover member 101 is, for example, a glass substrate or a resin substrate.

The cover member 101, the sensor unit 10, and the display panel 30 are not limited to a rectangular shape in a plan view but may have a circular shape, an oval shape, or a deformed shape of each of these outer shapes, part of which is omitted. Alternatively, the outer shape of the cover member 101 may be different from the outer shapes of the sensor unit 10 and the display panel 30 as in a case, for example, where the cover member 101 has a circular shape and the sensor unit 10 and the display panel 30 have a regular polygonal shape.

The cover member 101 is not limited to a flat plate shape but may have a curved display configuration with a curved surface in which, for example, the display region AA has a curved surface or the frame region GA is curved toward the display panel 30 side.

As illustrated in FIGS. 1 and 2, a decorative layer 110 is provided on the second surface 101b of the cover member 101 in the frame region GA. The decorative layer 110 is a coloring layer having a smaller light transmittance than that of the cover member 101. The decorative layer 110 can prevent wires, circuits, and the like superimposed on the frame region GA from being visually recognized by a viewer. The decorative layer 110 is provided on the second surface 101b in the example illustrated in FIG. 2 but may be provided on the first surface 101a. The decorative layer 110 is not limited to a single layer but may be a stack of a plurality of layers.

The detection device 1 includes the sensor unit 10 configured to detect concavity-convexity of the surface of a finger Fin or the like contacting or nearby the first surface 101a of the cover member 101. As illustrated in FIG. 2, the sensor unit 10 of the detection device 1 is provided on the display panel 30. In other words, the sensor unit 10 is provided between the cover member 101 and the display panel 30 and overlaps the display panel 30 when viewed in a direction orthogonal to the first surface 101a. The sensor unit 10 is coupled to a flexible printed board 76 through which a detection signal from the sensor unit 10 can be output to the outside.

One surface of the sensor unit 10 is bonded to the cover member 101 with a bonding layer 71 interposed therebetween. The other surface of the sensor unit 10 is bonded to a polarization plate 35 of the display panel 30 with a bonding layer 72 interposed therebetween. The bonding layer 71 is, for example, optical clear resin (OCR; or liquid optically clear adhesive (LOCA)) that is liquid UV curable resin. The bonding layer 72 is, for example, optical clear adhesive (OCA).

The display panel 30 includes a first substrate 31, a second substrate 32, a polarization plate 34 provided on the lower side of the first substrate 31, and the polarization plate 35 provided on the upper side of the second substrate 32. The first substrate 31 is coupled to a flexible printed board 75. Liquid crystal display elements as a display functional layer are provided between the first substrate 31 and the second substrate 32. In other words, the display panel 30 is a liquid crystal panel. The display panel 30 is not limited thereto but may be, for example, an organic EL display panel (organic light emitting diode (OLED)) or an inorganic EL display (micro LED or mini LED). Alternatively, the display panel may be a liquid crystal display (LCD) panel using liquid crystal elements as display elements, or an electrophoretic display (EPD) panel using electrophoretic elements as display elements.

As illustrated in FIG. 2, the sensor unit 10 is disposed at a position closer to the cover member 101 than the display panel 30 in a direction orthogonal to the second surface 101b of the cover member 101. Thus, the distance between a fingerprint detection electrode and the first surface 101a as the detection surface can be reduced as compared to a case in which, for example, the fingerprint detection electrode is provided integrally with the display panel 30. Accordingly, the display device 100 including the detection device 1 of the present embodiment can have improved detection performance.

The display device 100 has a configuration of what is called an out-cell scheme in which the sensor unit 10 and the display panel 30 are independent from each other, but may have a configuration of what is called an in-cell scheme or an on-cell scheme in which some substrates or electrodes are shared between the sensor unit 10 and the display panel 30.

Figure 3:
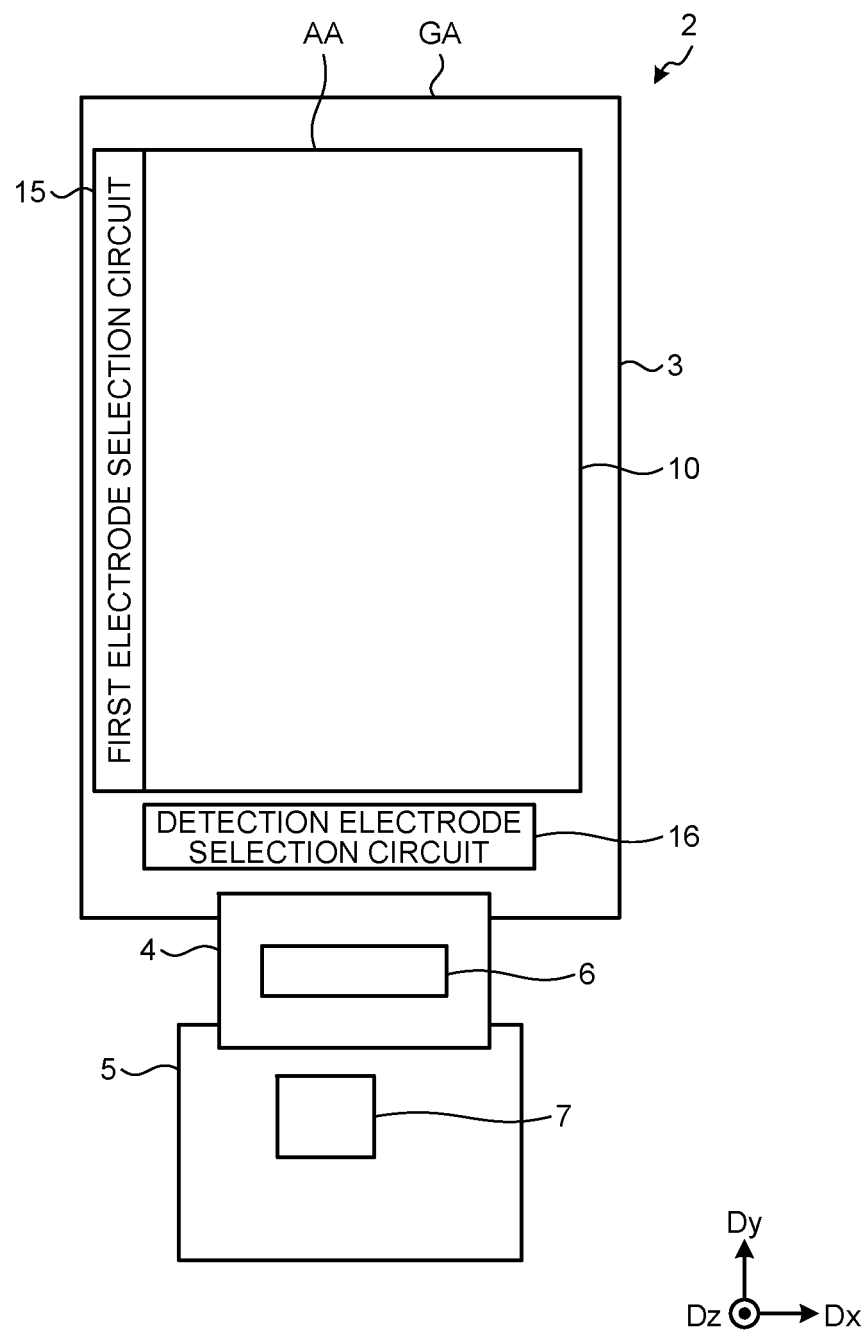
FIG. 3 is a plan view illustrating the detection system according to the embodiment.

FIG. 3 is a plan view illustrating a detection system according to the embodiment. As illustrated in FIG. 3, this detection system 2 includes a substrate 3, a wiring substrate 4, and a control board 5. The substrate 3 is electrically coupled to the control board 5 through the wiring substrate 4.

The substrate 3 has the detection region AA and the peripheral region GA described above. The sensor unit 10 is provided in the detection region AA. A first electrode selection circuit 15 and a detection electrode selection circuit 16 are provided in the peripheral region GA.

A detection circuit 6 is provided on the wiring substrate 4. The detection circuit 6 is, for example, a detection IC.

A control circuit 7 is provided on the control board 5. The control circuit 7 is, for example, a host IC configured as a field programmable gate array (FPGA). The control circuit 7 supplies control signals to the sensor unit 10, the first electrode selection circuit 15, the detection electrode selection circuit 16, and the detection circuit 6 and controls detection operation of the sensor unit 10. One or both of the first electrode selection circuit 15 and the detection electrode selection circuit 16 may be provided in the detection circuit 6 or the control circuit 7.

The first electrode selection circuit 15 is provided in a region extending in a second direction Dy in the peripheral region GA. The detection electrode selection circuit 16 is provided in a region extending in a first direction Dx in the peripheral region GA and provided between the sensor unit 10 and the detection circuit 6.

In the present embodiment, the detection device 1 includes the sensor unit 10, the first electrode selection circuit 15, the detection electrode selection circuit 16, and the detection circuit 6. The detection system 2 includes the detection device 1 and the control circuit 7.

The first direction Dx is an in-plane direction parallel to the substrate 3. The second direction Dy is an in-plane direction parallel to the substrate 3 and orthogonal to the first direction Dx. The second direction Dy may intersect the first direction Dx instead of being orthogonal. A third direction Dz is a direction orthogonal to the first direction Dx and the second direction Dy and is the normal direction of the substrate 3.

First Embodiment

Figure 4:
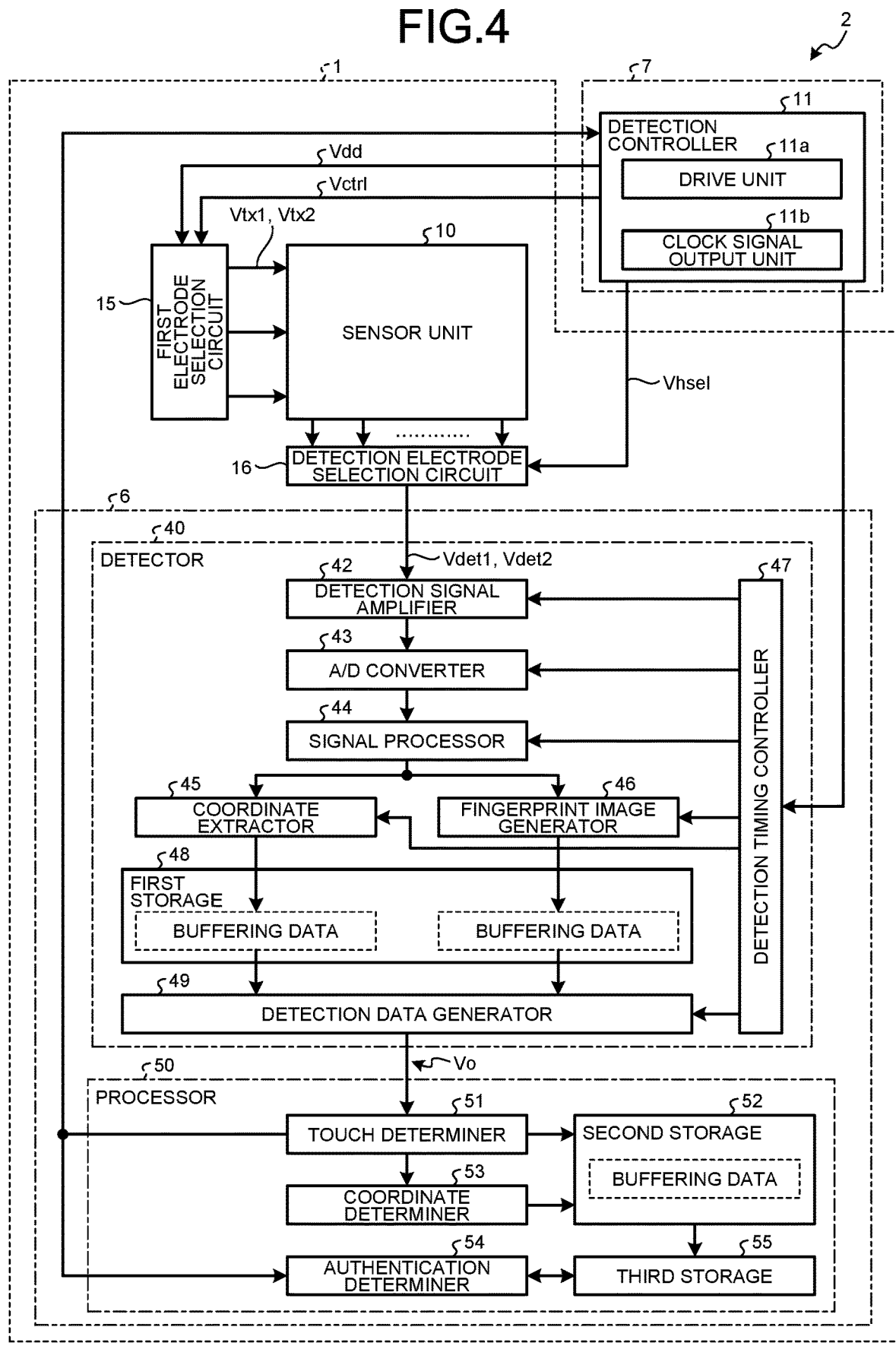
FIG. 4 is a block diagram illustrating an exemplary configuration of the detection system according to a first embodiment.

The following describes a detailed configuration of the detection device 1. FIG. 4 is a block diagram illustrating an exemplary configuration of a detection system according to a first embodiment. As illustrated in FIG. 4, the detection system 2 includes the detection device 1 and the control circuit 7 as a host device of the detection device 1. The detection device 1 includes the sensor unit 10, a detection controller 11, the first electrode selection circuit 15, the detection electrode selection circuit 16, a detector 40, and a processor 50. In the present embodiment, the control circuit 7 illustrated in FIG. 3 includes the detection controller 11. In the present embodiment, the detection circuit 6 illustrated in FIG. 3 includes the detector 40 and the processor 50.

The sensor unit 10 performs detection in accordance with a second drive signal Vtx2 supplied from the first electrode selection circuit 15. Specifically, a plurality of first electrodes Tx (refer to FIG. 6) are individually or simultaneously selected through operation of the first electrode selection circuit 15. Then, the first electrode selection circuit 15 supplies the second drive signal Vtx2 having a phase determined based on a predetermined sign to each of the selected first electrodes Tx. The sensor unit 10 converts change in concavity-convexity of the surface of the contacting or nearby finger Fin or hand into change in an electric signal based on the principle of mutual capacitive detection and outputs the electric signal to the detection circuit 6.

The sensor unit 10 can also detect the position (coordinate) of the contacting or nearby finger Fin or the like in accordance with a first drive signal Vtx1 supplied from the first electrode selection circuit 15. The sensor unit 10 performs detection over the entire detection region FA by scanning the first electrodes Tx for each first electrode block including a plurality of first electrodes Tx or for each one in a plurality of first electrodes Tx. The sensor unit 10 outputs change in an electric signal due to existence of the finger Fin contacting the detection surface to the detection circuit 6 based on the principle of mutual capacitive detection. The above-described touch detection on the detection surface in accordance with the first drive signal Vtx1 only requires detection and specification of the coordinate of the finger and thus has a detection resolution lower than the detection in accordance with the second drive signal Vtx2 does.

The detection controller 11 is a circuit configured to control operation of the first electrode selection circuit 15, the detection electrode selection circuit 16, and the detector 40 by supplying a control signal to each of the components. The detection controller 11 includes a drive unit 11a and a clock signal output unit 11b. The drive unit 11a supplies power voltage Vdd to the first electrode selection circuit 15. The detection controller 11 supplies various kinds of control signals Vctrl to the first electrode selection circuit 15 based on a clock signal from the clock signal output unit 11b.

The first electrode selection circuit 15 is a circuit configured to simultaneously or individually select a plurality of first electrodes Tx based on various kinds of the control signals Vctrl. The first electrode selection circuit 15 supplies the first drive signal Vtx1 or the second drive signal Vtx2 to the plurality of selected first electrodes Tx based on the various kinds of control signals Vctrl and the power voltage Vdd. The first drive signal Vtx1 and the second drive signal Vtx2 include not only those having mutually different waveforms including wavelengths and amplitudes but also those having the same waveform and output to the sensor unit 10 in mutually different durations. The sensor unit 10 can achieve a plurality of detection modes of a first detection mode M1, a second detection mode M2, a third detection mode M3, and a fourth detection mode M4 (refer to FIGS. 10 to 13) by differentiating the state of selection of first electrodes Tx by the first electrode selection circuit 15.

Figure 6:
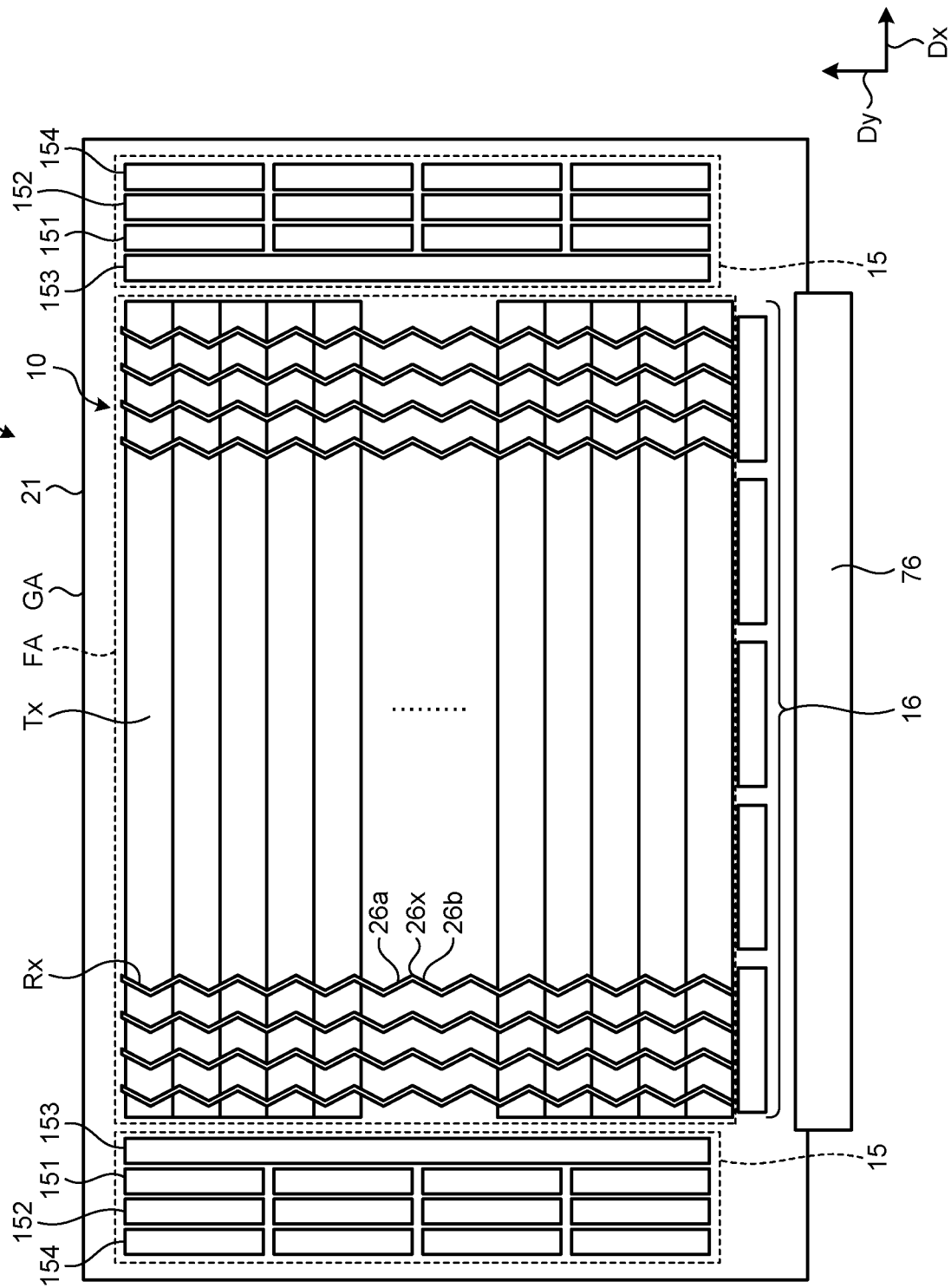
FIG. 6 is a plan view of the detection device according to the first embodiment.

The detection electrode selection circuit 16 is a switch circuit configured to simultaneously select a plurality of second electrodes Rx (refer to FIG. 6). The detection electrode selection circuit 16 selects a plurality of second electrodes Rx based on a second electrode selection signal Vhse1 supplied from the detection controller 11 and couples the plurality of second electrodes Rx and the detection circuit 6.

The detector 40 is a circuit configured to detect existence of a touch of the finger on the detection surface at a relatively large pitch based on a control signal supplied from the detection controller 11 and a first detection signal Vdet1 and a second detection signal Vdet2 supplied from the sensor unit 10 and detect a fingerprint of the finger at a relatively minute pitch. The detector 40 includes a detection signal amplifier 42, an A/D converter 43, a signal processor 44, a coordinate extractor 45, a fingerprint image generator 46, a detection timing controller 47, a first storage 48, and a detection data generator 49.

The detection timing controller 47 controls the detection signal amplifier 42, the A/D converter 43, the signal processor 44, the coordinate extractor 45, the fingerprint image generator 46, and the detection data generator 49 based on a control signal supplied from the detection controller 11 so that these components operate in synchronization. The first detection signal Vdet1 and the second detection signal Vdet2 are simply referred to as a detection signal Vdet when not needed to be distinguished from each other in the following description.

The first storage 48 may be, for example, a random access memory (RAM), a read only memory (ROM), or a register circuit. In the present embodiment, the first storage 48 stores, as buffering data, a touch detection coordinate acquired by the coordinate extractor 45 and a fingerprint image generated by the fingerprint image generator 46.

The sensor unit 10 supplies the first detection signal Vdet1 and the second detection signal Vdet2 to the detection signal amplifier 42. The detection signal amplifier 42 amplifies the first detection signal Vdet1 and the second detection signal Vdet2. The A/D converter 43 converts an analog signal output from the detection signal amplifier 42 into a digital signal.

The signal processor 44 performs predetermined decoding processing based on an output signal from the A/D converter 43. Specifically, the signal processor 44 performs processing of extracting a differential signal (absolute value $|\Delta V|$) of the detection signal Vdet. The signal processor 44 performs determination based on comparison of the absolute value $|\Delta V|$ with a predetermined threshold voltage and outputs a result of the determination.

The coordinate extractor 45 calculates a touch panel coordinate based on the determination result from the signal processor 44 and stores the obtained touch panel coordinate as buffering data in the first storage 48.

The fingerprint image generator 46 generates a fingerprint image based on the determination result from the signal processor 44 and stores the obtained fingerprint image in the first storage 48 as buffering data. The present disclosure is not limited by this fingerprint image generation method.

The coordinate extraction circuit 45 may generate a fingerprint image of the finger Fin in place of the above-described fingerprint image generator 46. In this case, the coordinate position and generation of a fingerprint image can be formed by the coordinate extraction circuit alone, and the fingerprint image generator is unnecessary.

The detection data generator 49 combines the pieces of buffering data stored in the first storage 48 and outputs the combination as a sensor output Vo.

The detection device 1 detects the finger Fin contacting the detection surface of the sensor unit 10 based on the principle of capacitive detection (hereinafter referred to as "touch detection"). The detection device 1 also detects a fingerprint by detecting concavity-convexity of the surface of the finger Fin contacting the sensor unit 10 based on the principle of capacitive detection (hereinafter referred to as "fingerprint detection").

In capacitive touch detection operation, a state in which capacitance change has occurred due to contact with the finger Fin is referred to as a "touched state" below. In addition, a state in which no capacitance change has occurred due to the finger Fin is referred to as a "non-touched state" below.

Figure 5:
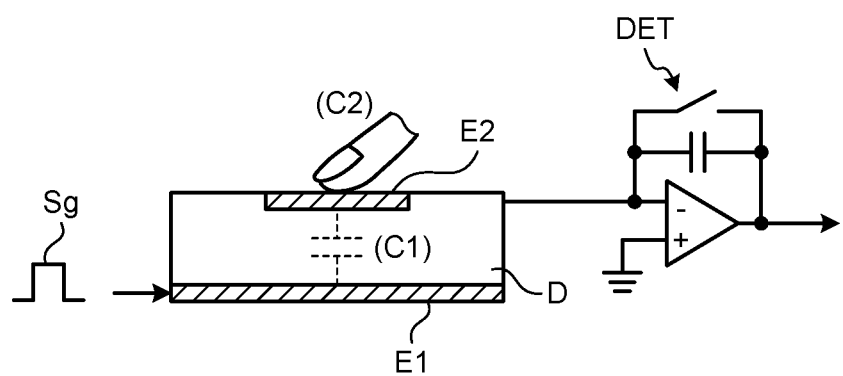
FIG. 5 is an explanatory diagram for description of the fundamental principle of mutual capacitive touch detection.

The following describes the fundamental principle of mutual capacitive touch detection by the detection device 1 of the present embodiment with reference to FIG. 5. FIG. 5 is an explanatory diagram for description of the fundamental principle of mutual capacitive touch detection. FIG. 5 also illustrates the detection circuit.

As illustrated in FIG. 5, a capacitor element C1 includes a pair of a drive electrode E1 and a detection electrode E2 disposed opposite each other with a dielectric D interposed therebetween. An electric field extending from end parts of the drive electrode E1 toward the upper surface of the detection electrode E2 in addition to an electric field (not illustrated) formed between facing surfaces of the drive electrode E1 and the detection electrode E2 occurs to the capacitor element C1. One end of the capacitor element C1 is coupled to an alternating-current signal source (drive signal source), and the other end thereof is coupled to a voltage detector DET. The voltage detector DET is, for example, an integration circuit included in the detector 40 illustrated in FIG. 4.

An alternating-current square wave Sg having a predetermined frequency (for example, several kHz to several hundreds kHz approximately) is applied from the alternating-current signal source to the drive electrode E1 (one end of the capacitor element C1). Current in accordance with the capacitance value of the capacitor element C1 flows to the voltage detector DET. The voltage detector DET converts current variation in accordance with the alternating-current square wave Sg into voltage variation.

As a capacitor C2 formed by the finger contacts the detection electrode E2 or becomes nearby the detection electrode E2 to such an extent that it can be regarded that the capacitor C2 contacts the detection electrode E2, fringe electrical lines of force between the drive electrode E1 and the detection electrode E2 are interrupted by the conductor (finger). Accordingly, the capacitor element C1 acts as a capacitor element having a further smaller capacitance value in accordance with approaching than a capacitance value in the non-contact state.

The amplitude of a voltage signal output from the voltage detector DET decreases as compared to the non-contact state as the finger Fin approaches the contact state. The absolute value $|\Delta V|$ of this voltage difference changes in accordance with influence of the finger Fin contacting the detection surface. The detector 40 determines whether the finger Fin is contacting the detection surface by comparing the absolute value $|\Delta V|$ with a predetermined threshold voltage. In the present embodiment, the determination is performed by any one of the signal processor 44 and the coordinate extractor 45 of the detector 40 or by both in cooperation.

The detector 40 further determines concavity-convexity of the finger Fin or the like based on the absolute value $|\Delta V|$. The concavity-convexity determination may be performed by comparing the absolute value $|\Delta V|$ with a predetermined threshold, and the threshold may be different from the threshold for determining whether the finger Fin is contacting/nearby or a plurality of thresholds may be used. In the present embodiment, the determination is performed by any one of the signal processor 44 and the fingerprint image generator 46 of the detector 40 or by both in cooperation. In this manner, the detector 40 can perform touch detection and fingerprint detection based on the fundamental principle of mutual capacitive touch detection.

In the present disclosure, a fingerprint image is data formed as surface information based on outputs from the second electrodes Rx and is different from a touch coordinate (point information) with which one or several coordinate positions are specified on the detection surface. More specifically, a fingerprint image is an assembly of pieces of detection data in a plurality of detection unit regions, and each piece of detection data includes, for example, the coordinate of the corresponding detection unit region and a result of concavity-convexity determination at each coordinate position. The concavity-convexity determination may provide such a binary determination result that the surface is determined to be concave when the detection result is larger than a threshold as described above or the surface is determined to be convex when the detection result is smaller than the threshold. Instead, the concavity-convexity determination may provide data obtained by further digitalizing an actual detection signal based on a plurality of thresholds. Two-dimensional surface information is formed through accumulation of these pieces of data for respective coordinates.

Although the finger Fin as the detection target body and a fingerprint thereof are detected in the present embodiment, the detection target body is not limited to a finger and the concavity-convexity of the detection target body is not limited to a fingerprint.

Figure 7:
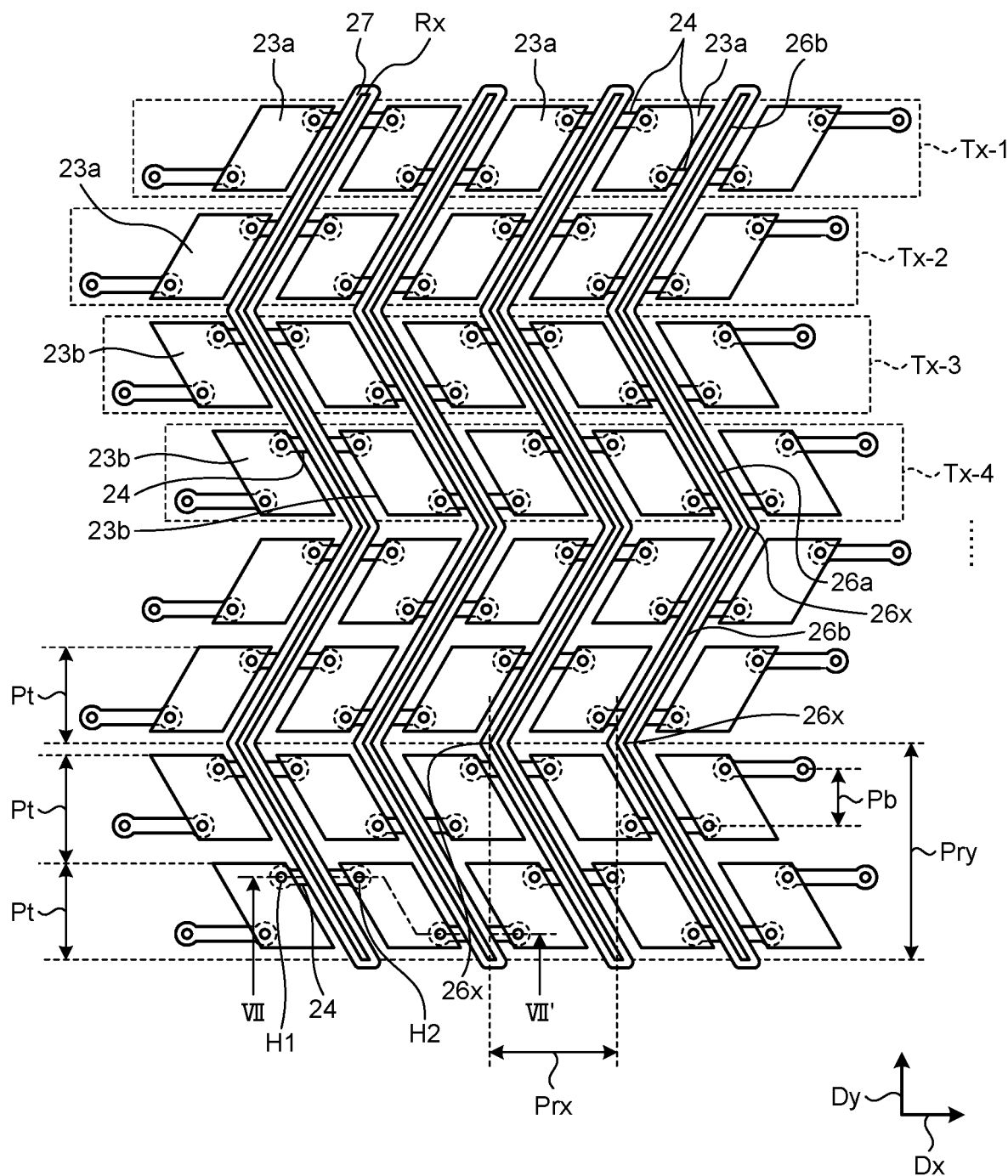
FIG. 7 is a plan view illustrating part of first electrodes and second electrodes in an enlarged manner.
Figure 8:
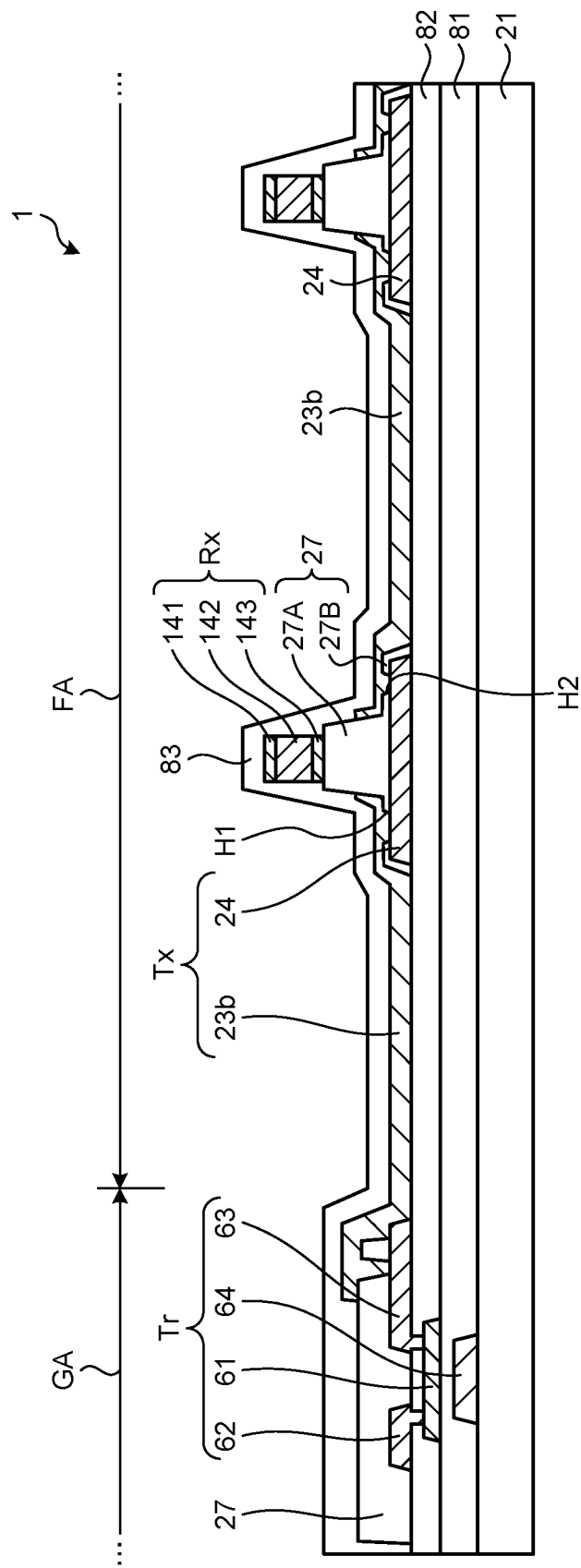
FIG. 8 is a sectional view taken along line VII-VII' in FIG. 7.

The following describes the configuration of the first electrodes Tx and the second electrodes Rx of the detection device 1. FIG. 6 is a plan view of the detection device according to the first embodiment. FIG. 7 is a plan view illustrating part of the first electrodes and the second electrodes in an enlarged manner. FIG. 8 is a sectional view taken along line VII-VII' in FIG. 7.

As illustrated in FIG. 6, the detection device 1 includes a sensor substrate 21, the first electrodes Tx and the second electrodes Rx provided on the sensor substrate 21. The sensor substrate 21 is a translucent glass substrate that can transmit visible light. Alternatively, the sensor substrate 21 may be a translucent resin substrate or film made of resin such as polyimide. The sensor unit 10 is a translucent sensor.

The first electrodes Tx extend in the first direction Dx and are arrayed in the second direction Dy. The second electrodes Rx extend in the second direction Dy and are arrayed in the first direction Dx. The second electrodes Rx extend in a direction intersecting the first electrodes Tx in a plan view. Each second electrode Rx is coupled through a frame wire (not illustrated) to the flexible printed board 76 provided on a short side of the frame region GA of the sensor substrate 21. The first electrodes Tx and the second electrodes Rx are provided in the detection region FA. The first electrodes Tx are made of translucent conductive material such as indium tin oxide (ITO). The second electrodes Rx are made of metallic material such as aluminum or aluminum alloy. The first electrodes Tx may be made of metallic material and the second electrodes Rx may be made of ITO. When the second electrodes Rx are made of metallic material, resistance on the detection signal Vdet can be reduced.

The first direction Dx is an in-plane direction parallel to the sensor substrate 21 and is, for example, a direction parallel to a side of the detection region FA. The second direction Dy is an in-plane direction parallel to the sensor substrate 21 and orthogonal to the first direction Dx. The second direction Dy may intersect the first direction Dx instead of being orthogonal. In the present specification, a "plan view" is a view in a direction orthogonal to the sensor substrate 21.

Capacitors are formed at respective intersections of the second electrodes Rx and the first electrodes Tx. When mutual capacitive touch detection operation is performed in the sensor unit 10, the first electrode selection circuit 15 selects first electrodes Tx and simultaneously supplies the first drive signal Vtx1 or the second drive signal Vtx2 to the selected first electrodes Tx. Then, fingerprint detection is performed as the detection signal Vdet in accordance with capacitance change due to concavity-convexity of the surface of a contacting or nearby finger or the like is output from each second electrode Rx. Alternatively, touch detection is performed as the detection signal Vdet in accordance with capacitance change due to a contacting or nearby finger or the like is output from each second electrode Rx.

As illustrated in FIG. 6, various circuits such as the first electrode selection circuit 15 and the detection electrode selection circuit 16 are provided in the frame region GA of the sensor substrate 21. The first electrode selection circuit 15 includes a first selection circuit 151, a second selection circuit 152, a third selection circuit 153, and a first electrode block selection circuit 154. However, this is merely exemplary. At least some of the various circuits may be included in a detection integrated circuit (IC) mounted on the flexible printed board 76. Alternatively, at least some of the various circuits may be provided on an external control board. The first selection circuit 151, the second selection circuit 152, the third selection circuit 153, and the first electrode block selection circuit 154 are not limited to a configuration in which each of the circuits is provided as an individual circuit. The first electrode selection circuit 15 may be provided as one integrated circuit having functions of the first selection circuit 151, the second selection circuit 152, the third selection circuit 153, and the first electrode block selection circuit 154. The first electrode selection circuit 15 may be a semiconductor integrated circuit (IC).

The following describes the configuration of the first electrodes Tx and the second electrodes Rx. As illustrated in FIG. 7, each second electrode Rx is a zigzag line and has a longitudinal direction along the second direction Dy as a whole. For example, each second electrode Rx includes a plurality of first straight parts 26a, a plurality of second straight parts 26b, and a plurality of bent parts 26x. The second straight parts 26b extend in a direction intersecting the first straight parts 26a. Each bent part 26x couples a first straight part 26a and a second straight part 26b.

The first straight parts 26a extend in a direction intersecting the first direction Dx and the second direction Dy. The second straight parts 26b extend in another direction intersecting the first direction Dx and the second direction Dy. Each first straight part 26a and a corresponding second straight part 26b are symmetric with respect to a virtual line (not illustrated) parallel to the first direction Dx. Each second electrode Rx is formed by alternately coupling the first straight parts 26a and the second straight parts 26b in the second direction Dy.

The disposition interval between the bent parts 26x of each second electrode Rx in the second direction Dy is represented by Pry. The disposition interval between the bent parts 26x of adjacent second electrodes Rx in the first direction Dx is represented by Prx. In the present embodiment, for example, Prx is preferably smaller than Pry. Each second electrode Rx is not limited to a zigzag shape but may have another shape such as a wavy shape or a straight shape.

As illustrated in FIG. 7, a plurality of first electrodes Tx-1, Tx-2, Tx-3, Tx-4, . . . each include a plurality of electrode parts 23a and 23b and a plurality of coupling parts 24. In the following description, the first electrodes Tx-1, Tx-2, Tx-3, Tx-4, . . . are simply referred to as first electrodes Tx when not needed to be distinguished from each other.

The first electrodes Tx-1 and Tx-2 intersecting the corresponding second straight parts 26b of the second electrodes Rx each include the electrode part 23a having two sides parallel to the second straight parts 26b. The first electrodes Tx-3 and Tx-4 intersecting the corresponding first straight parts 26a of the second electrodes Rx each include the electrode part 23b having two sides parallel to the first straight parts 26a. In other words, a plurality of electrode parts 23a and a plurality of electrode parts 23b are disposed along each second electrode Rx. Accordingly, the separation distance between the second electrode Rx in a zigzag shape and each of the electrode parts 23a and 23b is constant in a plan view.

The plurality of electrode parts 23a in each of the first electrodes Tx-1 and Tx-2 are arranged in the first direction Dx and separated from each other. In each first electrode Tx, each coupling part 24 couples adjacent electrode parts 23a among the plurality of electrode parts 23a. In a plan view, each second electrode Rx passes between adjacent electrode parts 23a and intersects coupling parts 24. The first electrodes Tx-3 and Tx-4 have the same configuration. Each second electrode Rx is a metal thin line, and the width of the second electrode Rx in the first direction Dx is smaller than the widths of the electrode parts 23a and 23b in the first direction Dx. With such a configuration, the area of regions in which the first electrodes Tx and the second electrodes Rx overlap decreases and parasitic capacitance decreases.

The disposition interval between the first electrodes Tx in the second direction Dy is represented by Pt. The disposition interval Pt is about half of the disposition interval Pry between the bent parts 26x of each second electrode Rx. The present invention is not limited thereto, and the disposition interval Pt may be any other value than a half-integer multiple of the disposition interval Pry. The disposition interval Pt is, for example, 50 μm to 100 μm inclusive. In each first electrode Tx, adjacent coupling parts 24 in the first direction Dx are disposed on opposite sides at a disposition interval Pb in the second direction Dy. The electrode parts 23a and 23b each have a parallelogram shape but may have any other shape. For example, the electrode parts 23a and 23b may each have a rectangular shape, a polygonal shape, or a deformed shape.

The following describes the layer structure of the detection device 1 with reference to FIG. 8. In FIG. 8, a section in the frame region GA is a section of a part including a thin film transistor Tr included in the first electrode selection circuit 15. In FIG. 8, a section taken along line VII-VII' in the detection region FA and the section of the part including the thin film transistor Tr in the frame region GA are connected to illustrate the relation between the layer structure of the detection region FA and the layer structure of the frame region GA.

As illustrated in FIG. 8, the thin film transistor Tr is provided in the frame region GA of the detection device 1. The thin film transistor Tr includes a semiconductor layer 61, a source electrode 62, a drain electrode 63, and a gate electrode 64. The gate electrode 64 is provided on the sensor substrate 21. A first inter-layer insulating film 81 is provided on the sensor substrate 21 and covers the gate electrode 64. The material of the gate electrode 64 is aluminum (Al), copper (Cu), silver (Ag), molybdenum (Mo), or alloy of these materials. The material of the first inter-layer insulating film 81 is a silicon oxide film (SiO), a silicon nitride film (SiN), or a silicon oxide nitride film (SiON). The first inter-layer insulating film 81 is not limited to a single layer but may be a film of a multilayered structure. For example, the first inter-layer insulating film 81 may be a film of a multilayered structure in which a silicon nitride film is formed on a silicon oxide film.

The semiconductor layer 61 is provided on the first inter-layer insulating film 81. A second interlayer insulating film 82 is provided on the first inter-layer insulating film 81 and covers the semiconductor layer 61. The semiconductor layer 61 is exposed at a bottom part of a contact hole provided through the second interlayer insulating film 82. The material of the semiconductor layer 61 is polysilicon or oxide semiconductor. The material of the second interlayer insulating film 82 is a silicon oxide film, a silicon nitride film, or a silicon oxide nitride film. The second interlayer insulating film 82 is not limited to a single layer but may be a film of a multilayered structure. For example, the second interlayer insulating film 82 may be a film of a multilayered structure in which a silicon nitride film is formed on a silicon oxide film.

The source electrode 62 and the drain electrode 63 are provided on the second interlayer insulating film 82. The source electrode 62 and the drain electrode 63 are each coupled to the semiconductor layer 61 through a contact hole provided through the second interlayer insulating film 82. The material of the source electrode 62, the drain electrode 63, and the coupling parts 24 is titanium aluminide (TiAl), which is an alloy of titanium and aluminum.

An insulating resin layer 27 and the electrode parts 23b and the coupling parts 24 of the first electrodes Tx are provided on the second interlayer insulating film 82. The resin layer 27 provided in the frame region GA covers the source electrode 62 and the drain electrode 63. The drain electrode 63 is electrically coupled to the corresponding first electrode Tx through a contact hole provided through the resin layer 27 provided in the frame region GA.

The resin layer 27 provided in the detection region FA includes a first resin layer 27A and a second resin layer 27B thinner than the first resin layer 27A. The first resin layer 27A covers a site positioned directly below the second electrode Rx at each coupling part 24. The second resin layer 27B provided in the detection region FA covers sites positioned directly below the electrode parts 23b at each coupling part 24.

Contact holes H1 and H2 are provided through the second resin layer 27B. In the detection region FA, a peripheral part of each electrode part 23b is coupled to the corresponding coupling part 24 through the contact holes H1 and H2. In this example, the electrode part 23b contacts the second interlayer insulating film 82.

The second electrodes Rx are provided on the first resin layer 27A. Each second electrode Rx includes, for example, a first metal layer 141, a second metal layer 142, and a third metal layer 143. The second metal layer 142 is provided on the third metal layer 143, and the first metal layer 141 is provided on the second metal layer 142. For example, the material of the first metal layer 141 and the third metal layer 143 is molybdenum or molybdenum alloy. The material of the second metal layer 142 is aluminum or aluminum alloy. Molybdenum or molybdenum alloy, of which the first metal layer 141 is made, has a lower visible light reflective index than aluminum or aluminum alloy, of which the second metal layer 142 is made. Accordingly, visual recognition of the second electrodes Rx can be prevented.

An insulating film 83 is provided on the resin layer 27, each electrode part 23b, and each second electrode Rx. The upper and side surfaces of the second electrode Rx are covered by the insulating film 83. The insulating film 83 is a film having a high refractive index and a low reflective index, such as a silicon nitride film.

In the above-described configuration, the first electrodes Tx and the second electrodes Rx are formed on the same sensor substrate 21. The first electrodes Tx and the second electrodes Rx are provided in different layers with the resin layer 27 interposed therebetween as an insulating layer.

Figure 9:
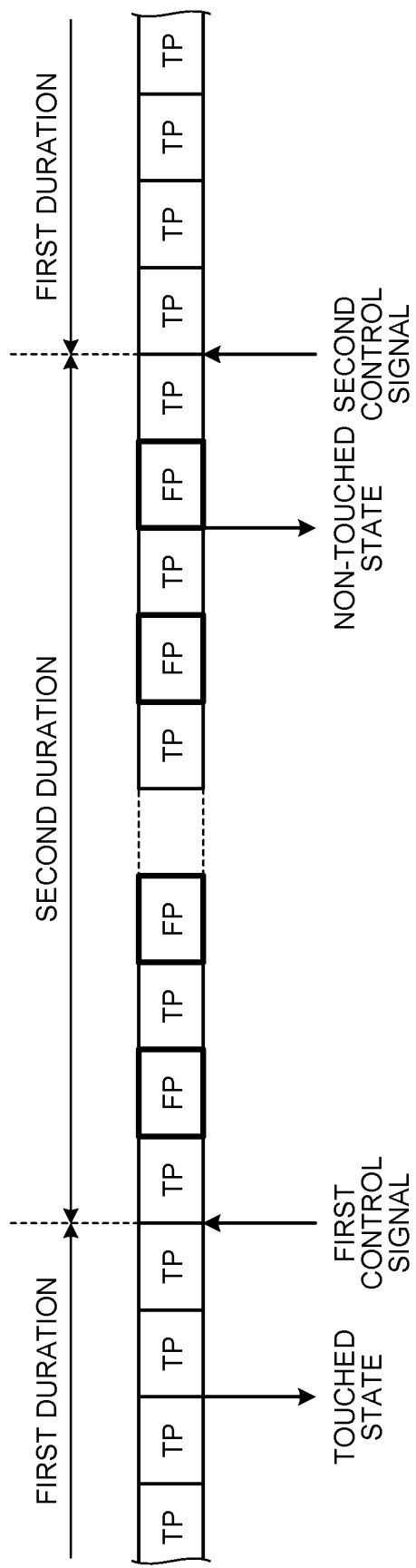
FIG. 9 is a timing chart illustrating exemplary operation of switching between a first duration and a second duration.

In the present disclosure, a detection duration of the detection device 1 includes a first duration in which touch detection durations (coordinate detection durations) are continuously provided and a second duration in which touch detection durations and fingerprint detection durations (surface information detection durations) are alternately repeated, each touch detection duration being a duration in which touch detection is executed, each fingerprint detection duration being a duration in which fingerprint detection is executed. FIG. 9 is a timing chart illustrating exemplary operation of switching between the first duration and the second duration. In FIG. 9, TP represents each touch detection duration (coordinate detection duration), and FP represents each fingerprint detection duration (surface information detection duration).

As illustrated in FIG. 9, the detection device 1 according to the present embodiment switches the first duration and the second duration in accordance with a result of touch determination in a touch detection duration TP in the first duration and the second duration. More specifically, as illustrated in FIG. 9, the first duration transitions to the second duration when a touched state is detected in a touch detection duration TP in the first duration, and the second duration transitions to the first duration when a non-touched state is detected in a touch detection duration TP in the second duration.

Although FIG. 9 illustrates the example in which touch detection and fingerprint detection are alternately executed in the second duration, the present invention is not limited thereto, and for example, fingerprint detection may be executed after touch detection is executed a plurality of times.

Figure 10:
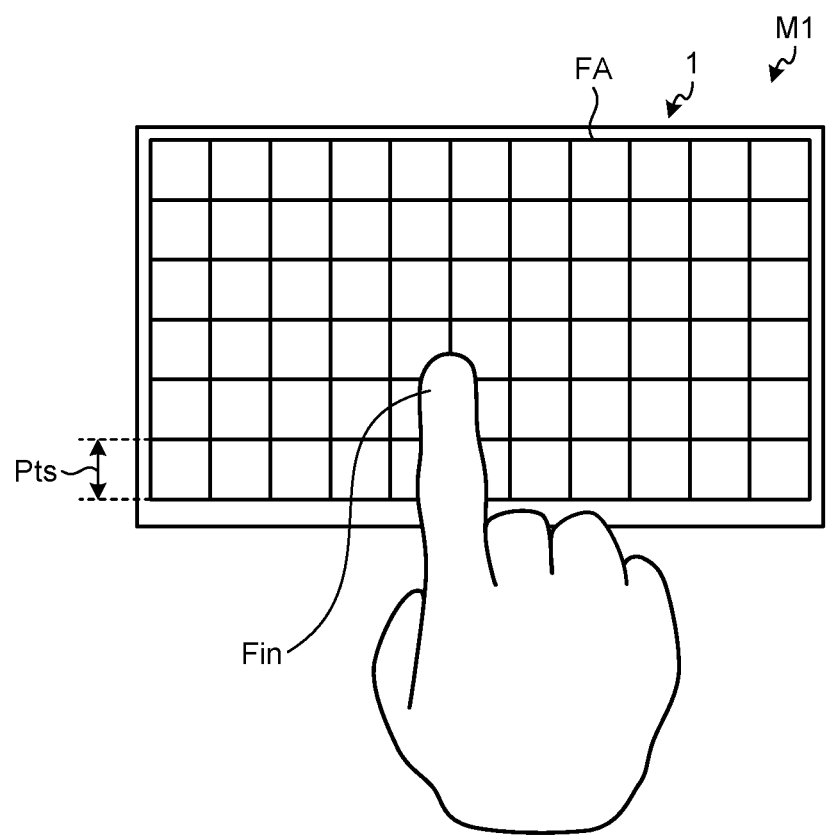
FIG. 10 is a diagram illustrating an exemplary first detection mode for executing touch detection in a touch detection duration.
Figure 11:
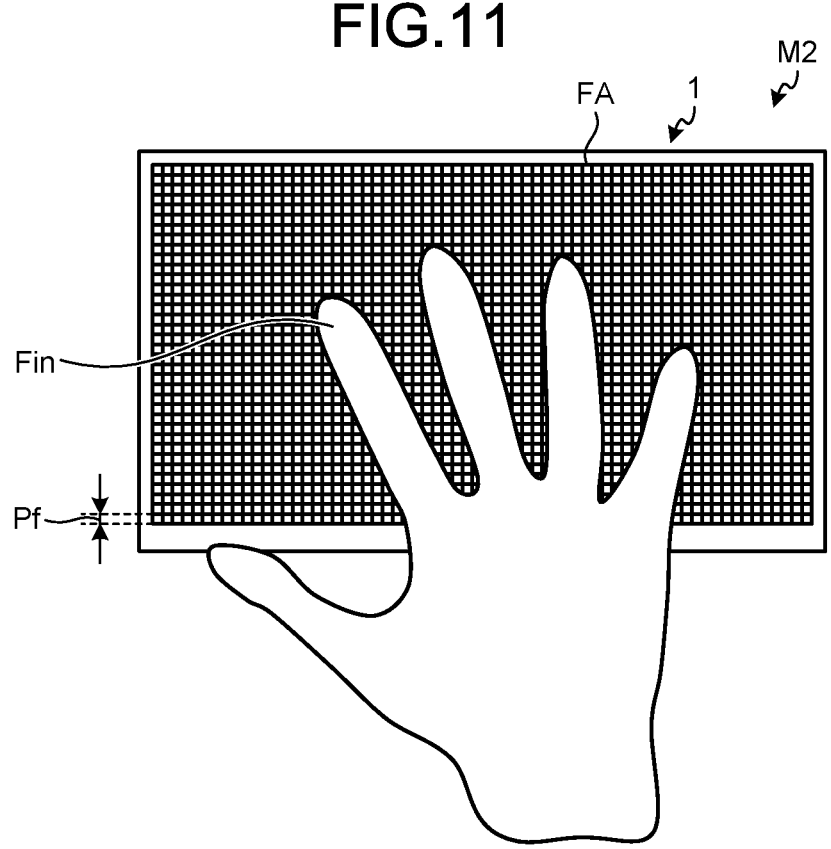
FIG. 11 is a diagram illustrating an exemplary second detection mode for executing fingerprint detection in a fingerprint detection duration.
Figure 12:
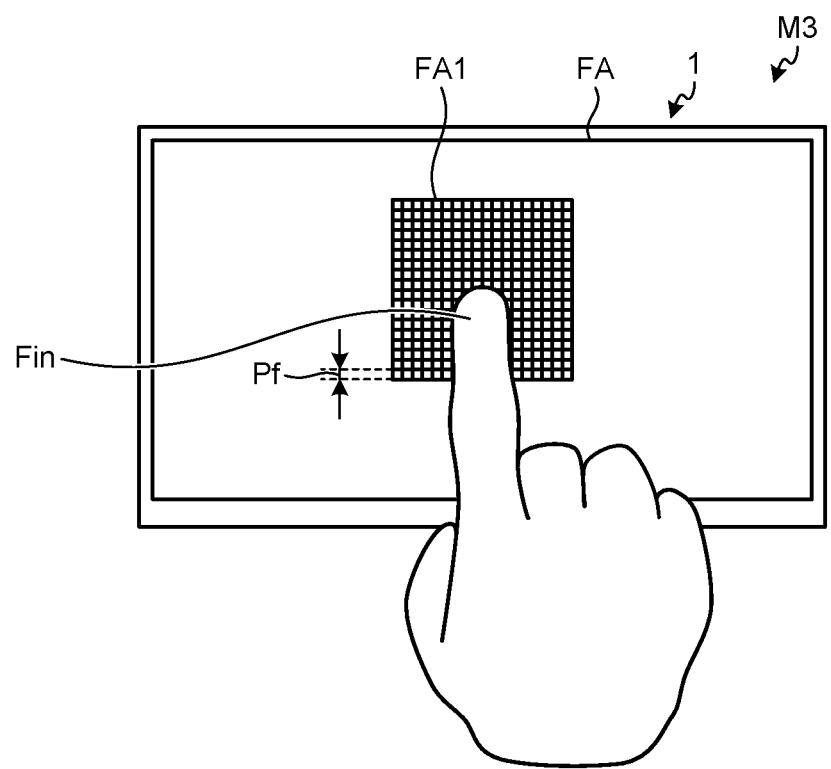
FIG. 12 is a diagram illustrating an exemplary third detection mode for executing fingerprint detection in a fingerprint detection duration.

The following describes specific detection modes in touch detection and fingerprint detection. FIG. 10 is a diagram illustrating an exemplary first detection mode for executing touch detection in a touch detection duration. FIG. 11 is a diagram illustrating an exemplary second detection mode for executing fingerprint detection in a fingerprint detection duration. FIG. 12 is a diagram illustrating an exemplary third detection mode for executing fingerprint detection in a fingerprint detection duration.

As illustrated in FIG. 10, in the first detection mode M1, the detection device 1 performs detection of the finger Fin or the like, more specifically, detection of the position of the finger on the detection surface (the coordinate position of the finger on the detection surface) by scanning the entire detection region FA at a first detection pitch Pts that is larger than in the second detection mode M2 (refer to FIG. 11). In the first detection mode M1, the first electrode selection circuit 15 supplies the first drive signal Vtx1 to each first electrode block as a bundle of a plurality of first electrodes Tx that are adjacent to each other or disposed at a predetermined pitch. The same first drive signal Vtx1 is supplied to the first electrodes Tx included in at least one first electrode block BK. Accordingly, in the first detection mode M1, detection can be performed at the first detection pitch Pts that is larger than in the second detection mode M2 to be described later. In the first detection mode M1, the detection electrode selection circuit 16 may supply the second drive signal Vtx2 to each second electrode block as a bundle of a plurality of second electrodes Rx that are adjacent to each other or disposed at a predetermined pitch. All second electrodes Rx may be coupled to the detector 40.

As illustrated in FIG. 11, in the second detection mode M2, the detection device 1 performs detection of the finger Fin or the like, more specifically, detection of concavity-convexity of the surface of the detection target body on the detection surface (for example, a fingerprint image of the detection target body contacting the detection surface) by scanning the entire detection region FA at a second detection pitch Pf that is smaller than in the first detection mode M1 (refer to FIG. 10). In the second detection mode M2, the first electrode selection circuit 15 supplies the second drive signal Vtx2 having a phase determined based on a predetermined sign to each first electrode Tx. Alternatively, the first electrode selection circuit 15 may individually scan each first electrode and supply a pulsed wave as the second drive signal Vtx2 along with the scanning. Hereinafter, supply of the second drive signal Vtx2 includes any of these aspects. Accordingly, in the second detection mode M2, the detection device 1 can perform detection at the second detection pitch Pf that is smaller than in the first detection mode M1. More specifically, even in a state in which the finger is contacting the detection surface from the standpoint of a macroscopic viewpoint, part of the finger is contacting the detection surface but the other part is slightly separated from the detection surface from the standpoint of a microscopic viewpoint due to concavity-convexity of the surface of the finger. In the second detection mode M2, concavity-convexity of the surface of the detection target body (in this example, concavity-convexity of the surface of the finger, in other words, the fingerprint) in the microscopic viewpoint is detected. The second detection pitch only needs to be smaller than the first detection pitch, and the smallest second detection pitch is the pitch between two adjacent first electrodes or two adjacent detection electrodes intersecting them.

In the second detection mode M2, the detection device 1 performs detection in the entire detection region FA. Thus, the detection device 1 is not limited to fingerprint detection but may detect, for example, a palm print. Alternatively, the detection device 1 may detect the shape of a hand contacting or nearby the detection region FA and specify the position of a fingertip. In this case, a fingerprint can be detected by performing signal processing and arithmetic processing only in a region that the fingertip contacting or nearby.

Touch detection in the first detection mode M1 is executed in the first duration, and touch detection in the first detection mode M1 and fingerprint detection in the second detection mode M2 are repeatedly executed in the second duration. Accordingly, the first duration in which touch detection durations TP are continuously provided, and the second duration in which touch detection durations TP and fingerprint detection durations FP are alternately repeated are achieved.

In fingerprint detection, a region in which fingerprint detection is performed on the detection surface may be a partial region on the detection surface. For example, in the third detection mode M3, the detection device 1 performs detection at the second detection pitch Pf in a first partial region FA1 as part of the detection region FA as illustrated in FIG. 12. In the third detection mode M3, the first electrode selection circuit 15 supplies the second drive signal Vtx2 only to a plurality of first electrodes Tx included in the first partial region FA1. In the third detection mode M3 as well, the detection device 1 can perform detection at the second detection pitch Pf. For example, in the third detection mode M3, since detection is performed only in the first partial region FA1, the time taken for detection is shortened and processing 9 performed by the detector 40 (refer to FIG. 4) is reduced. The first partial region FA1 is a fixed region that is set in advance. However, the position and size of the first partial region FA1 may be modified as appropriate.

Fingerprint detection may be executed in the third detection mode M3 in place of the second detection mode M2 described above. Specifically, touch detection in the first detection mode M1 is executed in the first duration, and touch detection in the first detection mode M1 and fingerprint detection in the third detection mode M3 are repeatedly executed in the second duration. Accordingly, although a region in which fingerprint detection is performed is limited to the first partial region FA1 smaller than the detection region FA, the fingerprint detection duration FP is shortened and the time taken for detection is shortened.

Figure 13:
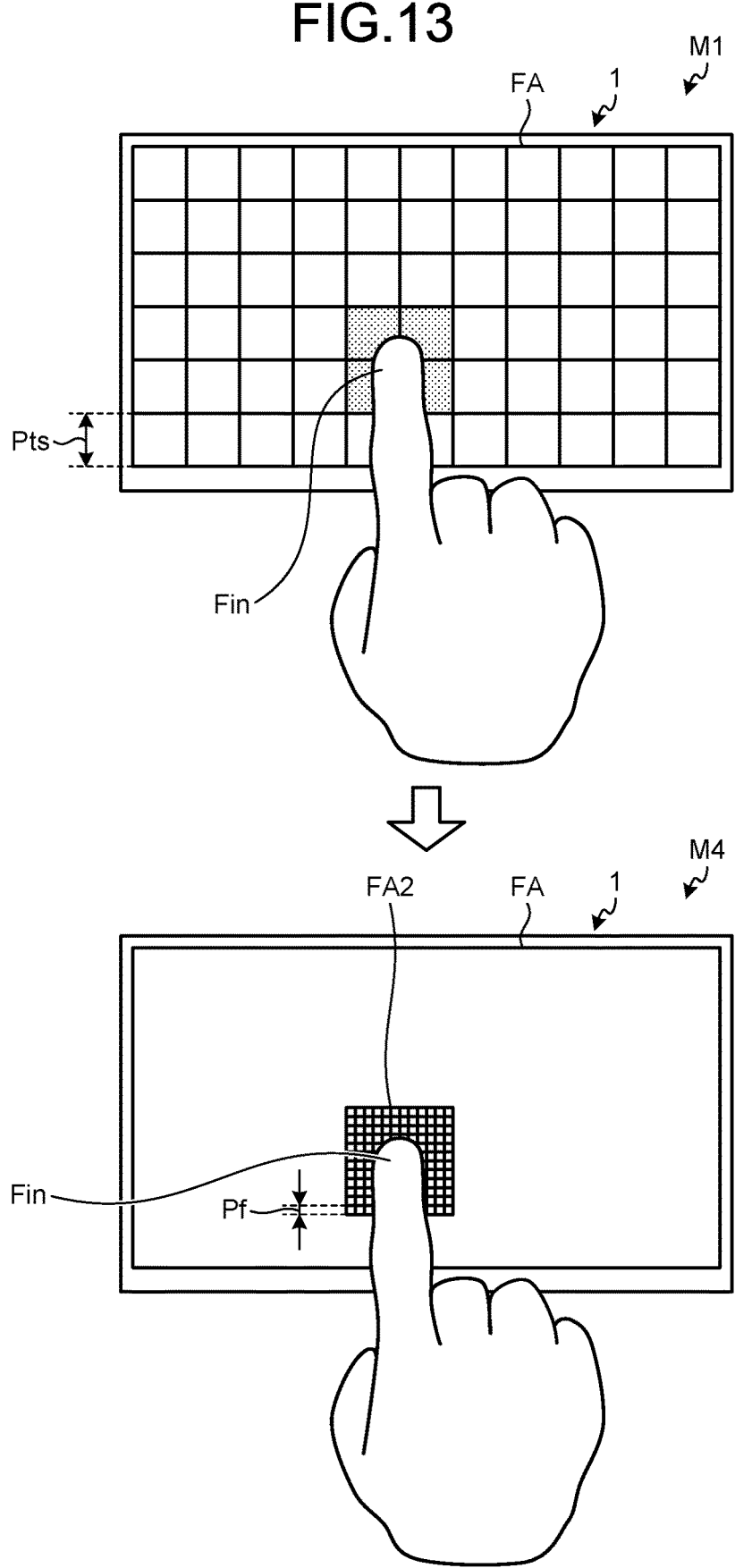
FIG. 13 is a diagram illustrating an exemplary fourth detection mode for repeatedly executing touch detection and fingerprint detection.

FIG. 13 is a diagram illustrating an exemplary fourth detection mode for repeatedly executing touch detection and fingerprint detection. For example, the detection device 1 executes touch detection in the first detection mode M1 in each touch detection duration TP in the first duration and detects whether the finger is contacting the detection surface. When having detected the finger Fin or the like, the detection device 1 transitions to the second duration and repeatedly executes touch detection in the first detection mode M1 and fingerprint detection in the fourth detection mode M4. In detection in the fourth detection mode M4, the detection device 1 performs detection at the second detection pitch Pf only in a second partial region FA2 as a predetermined region including a position at which the finger Fin or the like is detected. The position and size of the second partial region FA2 may be modified based on information of the finger Fin or the like detected in a touch detection duration TP. In this manner, fingerprint detection in the fourth detection mode M4 may be performed based on a result of detection in the first detection mode M1. Accordingly, the area of the second partial region FA2 can be reduced and thus the time taken for detection is shortened.

As illustrated in FIG. 4, the processor 50 includes a touch determiner 51, a second storage 52, a coordinate determiner 53, an authentication determiner 54, and a third storage 55.

The second storage 52 and the third storage 55 may be each, for example, a random access memory (RAM), a read only memory (ROM), or a register circuit. In the present embodiment, the second storage 52 stores, as buffering data, a fingerprint image that is output as the sensor output Vo from the detector 40. The third storage 55 stores, as authentication data, the fingerprint image stored as buffering data in the second storage 52. The third storage 55 also stores a result of determination by the authentication determiner 54.

The touch determiner 51 determines whether the current state is a touched state based on the sensor output Vo output from the detector 40. Specifically, for example, when having determined that the current state is a touched state in a touch detection duration TP in the first duration, the touch determiner 51 outputs a first control signal for transition to the second duration to the detection controller 11. For example, when having determined that the current state is a non-touched state in a touch detection duration TP in the second duration, the touch determiner 51 outputs a second control signal for transition to the first duration to the detection controller 11 and the authentication determiner 54.

The coordinate determiner 53 stores the sensor output Vo output from the detection data generator 49 of the detector 40 in the second storage 52 as buffering data. More specifically, after the detection duration has entered the second duration, a touch panel coordinate detected in a touch detection duration and fingerprint image data generated in a fingerprint detection duration right after the touch detection duration are combined by the detection data generator 49, and this combined data is output to the processor 50 as the sensor output Vo. The touch panel coordinate and the fingerprint image data thus paired are stored as buffering data in the second storage 52.

In addition, the coordinate determiner 53 calculates the difference value between the touch panel coordinate stored as buffering data in the second storage 52 and a touch panel coordinate acquired after the fingerprint detection duration FP in the second duration, and when the difference value is equal to or larger than a predetermined value, the coordinate determiner 53 discards the fingerprint image generated in the previous fingerprint detection duration FP and stored as buffering data in the second storage 52.

The coordinate determiner 53 calculates the difference value between the touch panel coordinate stored as buffering data in the second storage 52 and the touch panel coordinate acquired after the fingerprint detection duration FP in the second duration, and when the difference value is smaller than the predetermined value, the coordinate determiner 53 stores, as authentication data in the third storage 55, the fingerprint image generated in the previous fingerprint detection duration FP and stored as buffering data in the second storage 52.

The authentication determiner 54 determines authentication of the authentication data stored in the third storage 55 based on the second control signal from the touch determiner 51 and stores a result of the authentication in the third storage 55. The present disclosure is not limited by this authentication determination method.

Figure 14A:
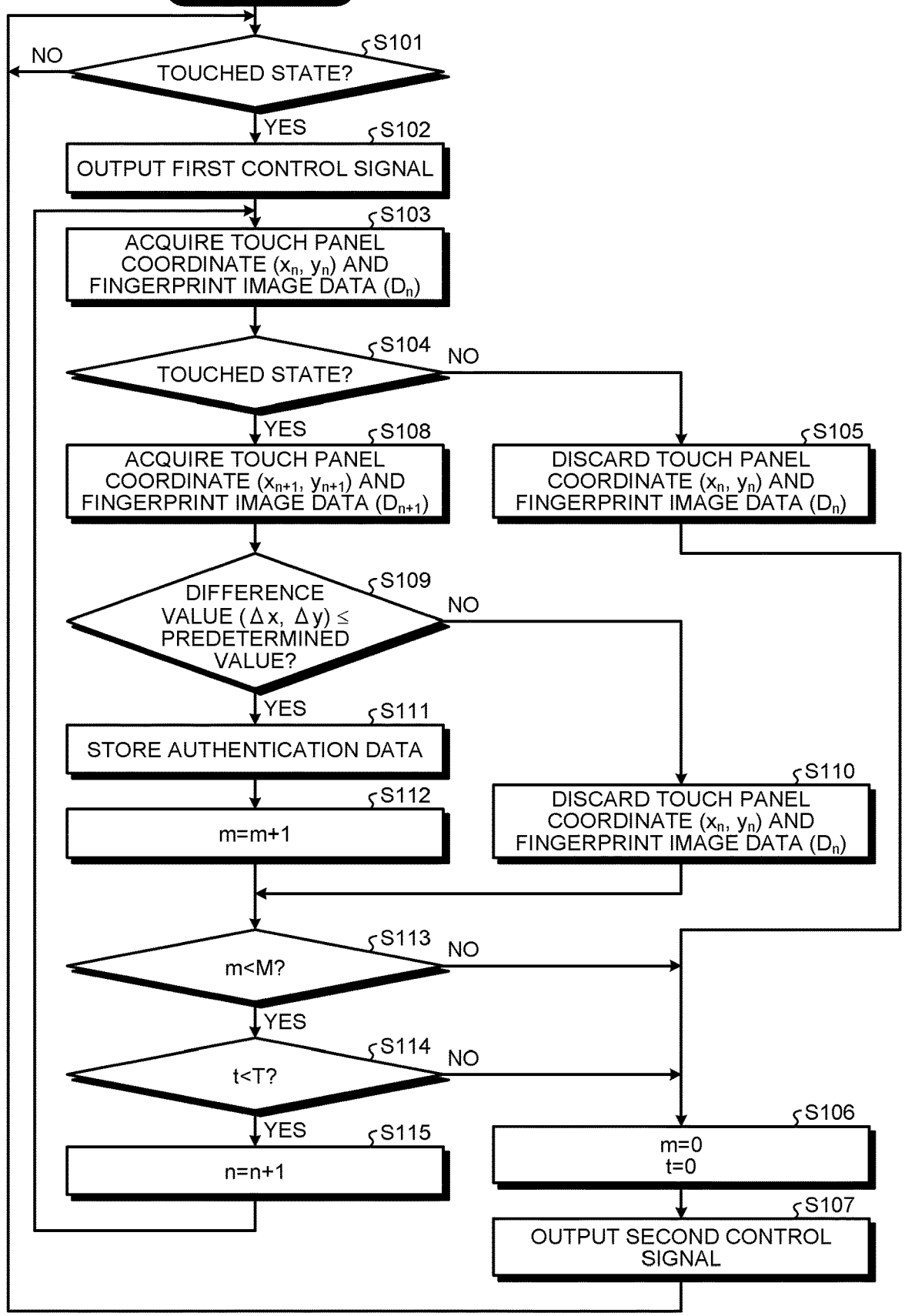
FIG. 14A is a flowchart illustrating exemplary authentication data acquisition processing at a processor of the detection device according to the first embodiment.
Figure 15:
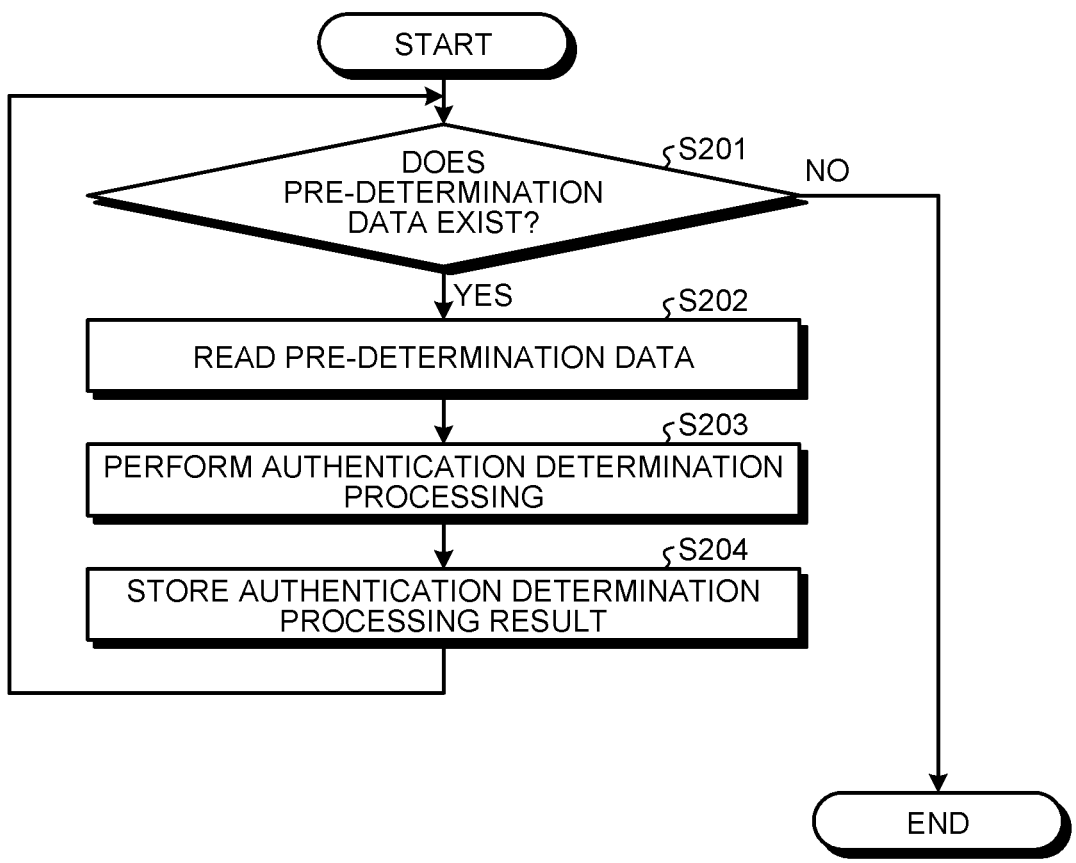
FIG. 15 is a flowchart illustrating exemplary authentication processing at the processor of the detection device according to the first embodiment.

The following describes specific examples of processing at the processor 50 of the detection device according to the first embodiment with reference to FIGS. 14A and 15. FIG. 14A is a flowchart illustrating exemplary authentication data acquisition processing at the processor of the detection device according to the first embodiment. FIG. 15 is a flowchart illustrating exemplary authentication processing at the processor of the detection device according to the first embodiment.

As a precondition of the authentication data acquisition processing illustrated in FIG. 14A, it is assumed that the detection device 1 is continuously executing touch detection to detect existence of a touch on the detection surface in the first duration. It is also assumed that an authentication data accumulation number m and an authentication data acquisition time (count value) t are reset (m=0 and t=0).

The touch determiner 51 determines whether the current state is a touched state based on a touch panel coordinate acquired in a touch detection duration in the first duration (step S101). When having determined that the current state is a non-touched state (No at step S101), the touch determiner 51 repeatedly executes the processing at step S101.

When having determined that the current state is a touched state (Yes at step S101), the touch determiner 51 outputs the first control signal to the detection controller 11 (step S102). Accordingly, the detection device 1 transitions to the second duration. The sensor output Vo(n) in the second duration thereafter is a pair of a touch panel coordinate $(x_n, y_n)$ acquired in a touch detection duration TP(n) and fingerprint image data (Dn) acquired in the fingerprint detection duration FP(n) in the touch detection duration right after.

The coordinate determiner 53 receives the sensor output Vo(n) from the detection data generator 49 of the detector 40 and stores, as buffering data in the second storage 52, the touch panel coordinate $(x_n, y_n)$ acquired in the touch detection duration TP(n) in the second duration and the fingerprint image data $(D_n)$ acquired in the fingerprint detection duration FP(n) in the second duration (step S103).

The touch determiner 51 determines whether the current state is a touched state based on the touch panel coordinate $(x_n, y_n)$ (step S104). When having determined that the current state is a non-touched state (No at step S104), the touch determiner 51 discards the touch panel coordinate $(x_n, y_n)$ and the fingerprint image data $(D_n)$ stored in the second storage 52 (step S105). In this case, the processor 50 resets the authentication data accumulation number m and the authentication data acquisition time (count value) t (m=0 and t=0) (step S106). Then, the touch determiner 51 outputs the second control signal to the detection controller 11 (step S107). Accordingly, the detection device 1 transitions to the first duration and repeatedly executes the processing at step S101 and later.

When the touch determiner 51 determines that the current state is a touched state (Yes at step S104), the coordinate determiner 53 additionally stores, as buffering data in the second storage 52, a touch panel coordinate $(x_{n+1}, y_{n+1})$ in a touch detection duration TP (n+1) and fingerprint image data $(D_{n+1})$ in a fingerprint detection duration FP(n+1), which are included in the next sensor output Vo(n+1) (step S108).

Subsequently, the coordinate determiner 53 determines whether a difference value ($\Delta x$, $\Delta y$) between two consecutive touch panel coordinates stored in the second storage 52, in other words, the touch panel coordinate $(x_n, y_n)$ and the touch panel coordinate $(x_{n+1}, y_{n+1})$ is equal to or smaller than a predetermined value (step S109).

When the difference value ($\Delta x$, $\Delta y$) is larger than the predetermined value (No at step S109), the coordinate determiner 53 discards the touch panel coordinate $(x_n, y_n)$ and the fingerprint image data $(D_n)$ stored in the second storage 52 (step S110) and transitions to processing at step S113. The predetermined value is preferably zero.

When the difference value ($\Delta x$, $\Delta y$) is equal to or smaller than the predetermined value (Yes at step S109), the coordinate determiner 53 stores, as authentication data in the third storage 55, the fingerprint image data $(D_n)$ stored in the second storage 52 (step S111). In this case, the processor 50 increments the authentication data accumulation number m (step S112) and transitions to the processing at step S113. Accordingly, a plurality of pieces of fingerprint image data are sequentially accumulated as authentication data.

At step S113, the processor 50 determines whether the authentication data accumulation number m is smaller than a predetermined authentication data accumulation number upper limit M. When the authentication data accumulation number m has reached the predetermined authentication data accumulation number upper limit M (No at step S113), the processor 50 resets the authentication data accumulation number m and the authentication data acquisition time (count value) t (m=0 and t=0) (step S106). Then, the touch determiner 51 outputs the second control signal to the detection controller 11 (step S107). Accordingly, the detection device 1 transitions to the first duration and repeatedly executes the processing at step S101 and later.

When the authentication data accumulation number m is smaller than the predetermined authentication data accumulation number upper limit M (Yes at step S113), the detection device 1 transitions to processing at step S114.

At step S114, the processor 50 determines whether the authentication data acquisition time (count value) t is smaller than a predetermined authentication data acquisition time upper limit T. When the authentication data acquisition time (count value) t has reached the predetermined authentication data acquisition time upper limit T (No at step S114), the processor 50 resets the authentication data accumulation number m and the authentication data acquisition time (count value) t (m=0 and t=0) (step S106). Then, the touch determiner 51 outputs the second control signal to the detection controller 11 (step S107). Accordingly, the detection device 1 transitions to the first duration and repeatedly executes the processing at step S101 and later.

When the authentication data acquisition time (count value) t is smaller than the predetermined authentication data acquisition time upper limit T (Yes at step S114), the touch panel coordinate $(x_{n+1}, y_{n+1})$ acquired in the touch detection duration TP(n+1) is set as the touch panel coordinate $(x_n, y_n)$ acquired in the touch detection duration TP(n) (step S115), and the processing at step S103 and later are repeatedly executed.

Through the authentication data acquisition processing described above, authentication data having a high certainty is accumulated in the third storage 55.

When it is determined that the current state is not a touched state in the second duration (No at step S104), when the authentication data accumulation number m has reached the predetermined authentication data accumulation number upper limit M (No at step S113), or when the authentication data acquisition time (count value) t has reached the predetermined authentication data acquisition time upper limit T (No at step S114), the processor 50 holds, as protect data, a plurality of pieces of authentication data stored in the third storage 55 and executes the authentication processing illustrated in FIG. 15.

The authentication determiner 54 determines whether authentication data before authentication determination (hereinafter also referred to as "pre-determination data") accumulated as protect data in the third storage 55 exists (step S201). When pre-determination data exists in the third storage 55 (Yes at step S201), the authentication determiner 54 reads the existing pre-determination data from the third storage 55 (step S202), executes predetermined authentication determination processing (step S203), and stores a result of the authentication determination processing in the third storage 55 (step S204). Collation data necessary for the authentication determination processing is transferred from a host to the authentication determiner 54 and stored in advance.

When no pre-determination data exists in the third storage 55 (No at step S201), the authentication processing illustrated in FIG. 15 ends. Since authentication data is stored as protect data in the third storage 55, for example, temporally sequential management and prioritization management of the authentication data are possible.

After the authentication processing described above, the processor 50 outputs an authentication determination processing result stored in the third storage 55 in accordance with authentication result request from the control circuit 7 as a host device at a higher level.

In the authentication data acquisition processing illustrated in FIG. 14A, a fingerprint image when the difference value $(\Delta x, \Delta y)$ between the touch panel coordinate $(x_n, y_n)$ as a touch detection coordinate in the touch detection duration TP(n) and the touch panel coordinate $(x_{n+1}, y_{n+1})$ as a touch detection coordinate in the touch detection duration TP(n+1) is smaller than the predetermined value (Yes at step S109) can be acquired and accumulated in the third storage 55 in the second duration. Accordingly, the accuracy of a fingerprint image used in the authentication processing illustrated in FIG. 15 is increased.

In the authentication processing illustrated in FIG. 15, the authentication determination processing result is stored in the third storage 55 before the authentication result request. Accordingly, a time loss in response to the authentication result request is reduced. Alternatively, an authentication result may be accumulated irrespective of existence of the authentication result request from the host device, and as a result, a time loss along with fingerprint authentication is reduced.

The present embodiment is described above with the example in which the authentication data accumulation number m is provided with the upper limit M and the authentication data acquisition time (count value) t is provided with the upper limit T, but the present invention is not limited thereto. For example, the authentication data accumulation number m may be provided with no upper limit M, and the reset processing of the authentication data accumulation number m at steps S112, S113, and S106 illustrated in FIG. 14A may be omitted. Alternatively, the authentication data acquisition time (count value) t may be provided with no upper limit T, and the reset processing of the authentication data acquisition time (count value) t at steps S114 and S106 illustrated in FIG. 14A may be omitted.

According to the present embodiment, the detection device 1 that can improve authentication accuracy is obtained.

Figure 14B:
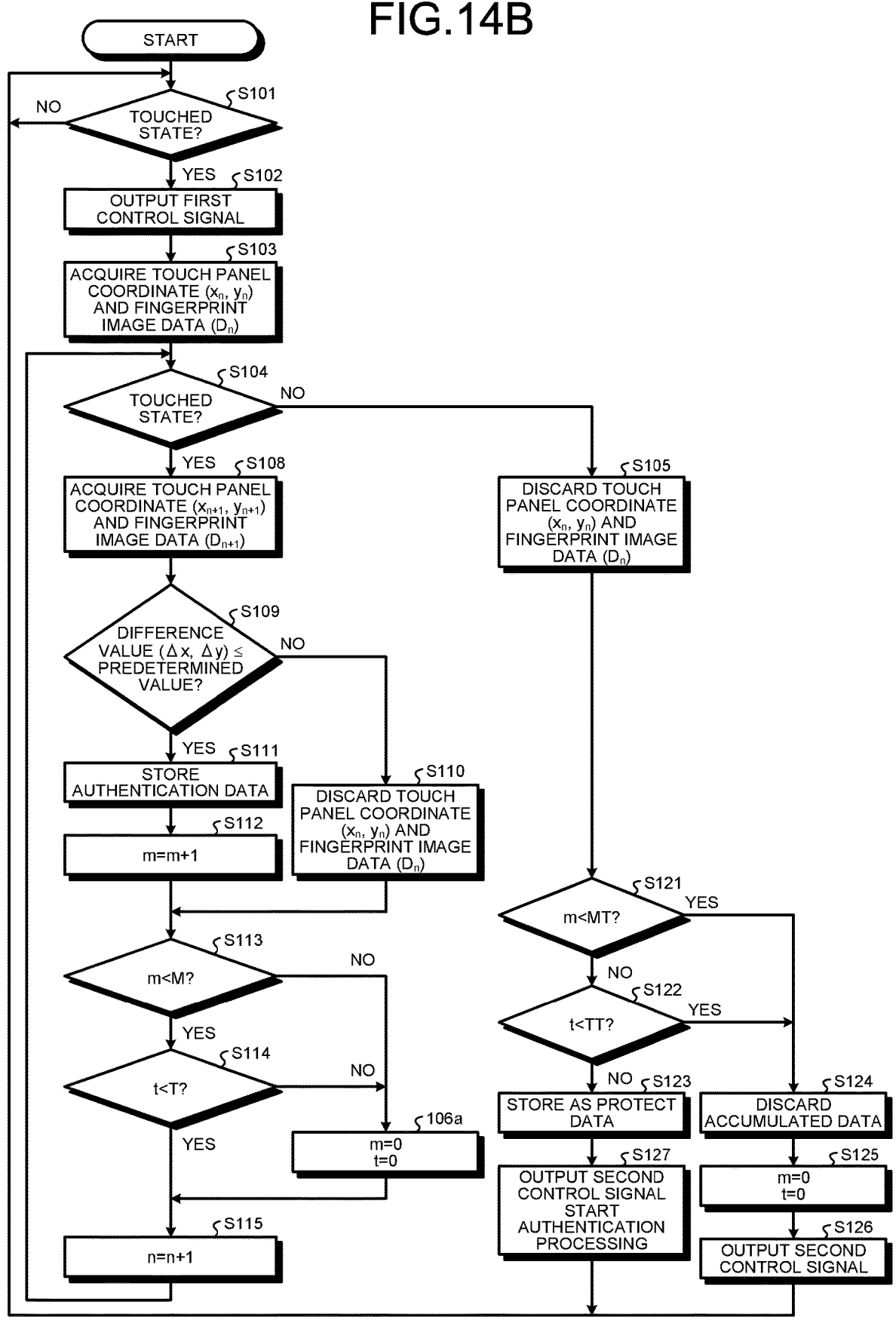
FIG. 14B is a diagram illustrating a modification of the authentication data acquisition processing illustrated in FIG. 14A.

FIG. 14B illustrates a modification of the authentication data acquisition processing illustrated in FIG. 14A. Any content common to FIG. 14A is denoted by the same reference sign and description thereof is omitted.

As illustrated in FIG. 14B, when the authentication data accumulation number m has reached the predetermined data accumulation number upper limit M (No at step S113) or when the authentication data acquisition time (count value) t has reached the predetermined authentication data acquisition time upper limit T (No at step S114), the processor 50 resets the authentication data accumulation number m and the authentication data acquisition time (count value) t (m=0 and t=0) (step S106a), and thereafter returns to step S115.

When having determined that the current state is not a touched state at step S104, in other words, when having determined that the finger moved away from the detection surface, the touch determiner 51 discards the touch panel coordinate $(x_n, y_n)$ and the fingerprint image data $(D_n)$ stored in the second storage 52 (step S105). Then, the processor 50 further determines whether the authentication data accumulation number m is smaller than a predetermined data accumulation number value MT (step S121), and further determines whether the authentication data acquisition time (count value) t is smaller than a predetermined data acquisition time value TT (step S122).

In the case of Yes determination at step S121 or S122, the processor 50 determines that fingerprint image data (authentication data) for transition to fingerprint authentication is not sufficiently accumulated, discards a plurality of pieces of fingerprint image data stored as authentication accumulated data in the third storage 55 (step S124), and resets the authentication data accumulation number m and the authentication data acquisition time (count value) t (m=0 and t=0) (step S125). Then, the touch determiner 51 outputs the second control signal to the detection controller 11 (step S126). Accordingly, the detection device 1 transitions to the first duration and repeatedly executes the processing at step S101 and later.

In the case of No determination at steps S121 and S122, the processor 50 determines that fingerprint image data (authentication data) for transition to fingerprint authentication is sufficiently accumulated, and holds and stores, as authentication protect data in the third storage 55, a plurality of pieces of fingerprint image data stored as accumulated data in the third storage 55 (step S123).

Thereafter, the authentication determiner 54 executes fingerprint authentication illustrated in FIG. 15 by using protect data stored in the third storage 55. The touch determiner 51 outputs the second control signal to the detection controller 11 (step S127). Accordingly, the detection device 1 transitions to the first duration and repeatedly executes the processing at step S101 and later.

In the authentication data acquisition processing of the above-described modification, any one of steps S121 and S122 may be omitted. Similarly, any one or both of steps S113 and S114 may be omitted.

Second Embodiment

Figure 16:
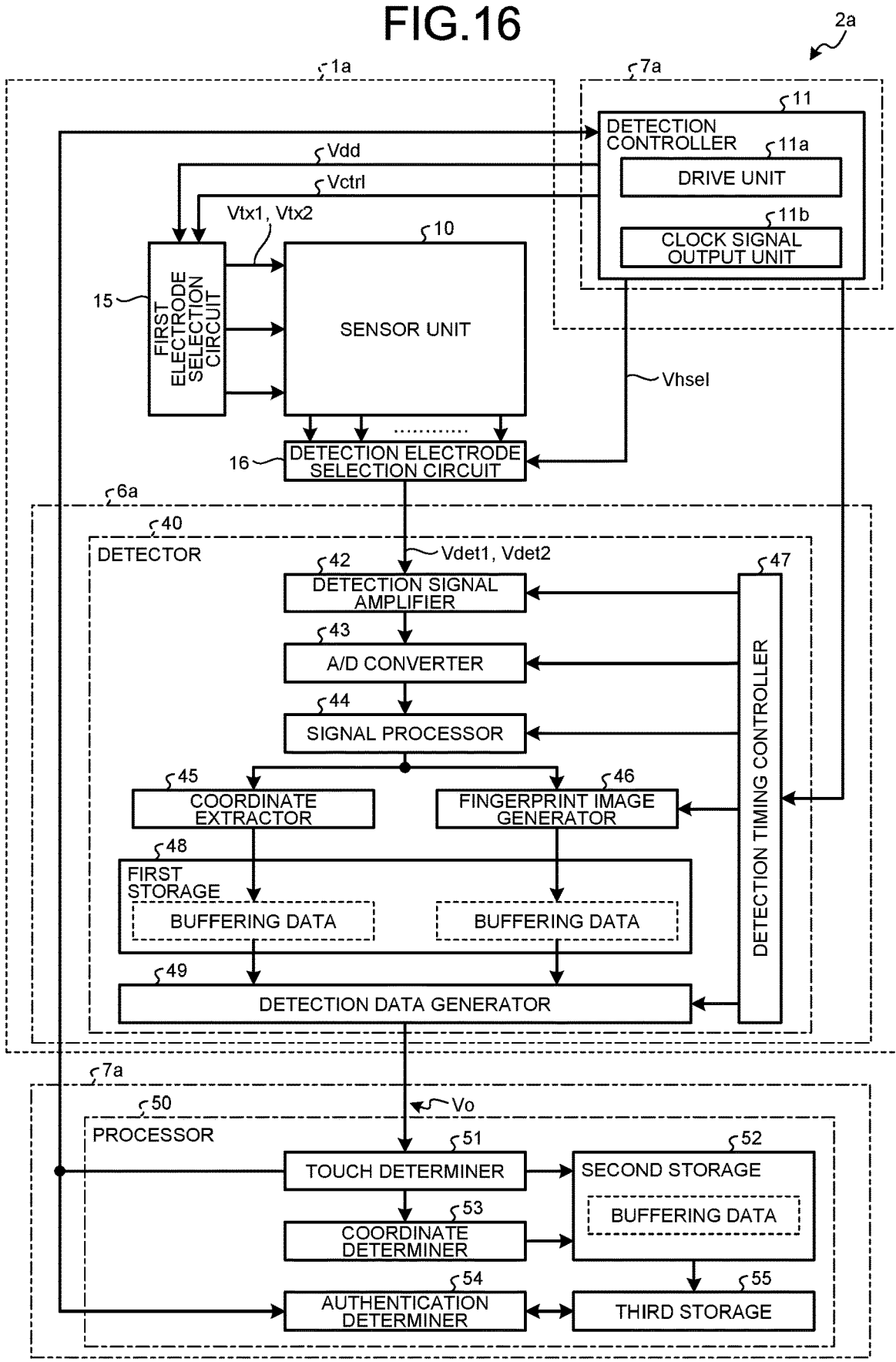
FIG. 16 is a block diagram illustrating an exemplary configuration of a detection system according to a second embodiment.

FIG. 16 is a block diagram illustrating an exemplary configuration of the detection system according to a second embodiment. Duplicate description of any component equivalent or identical to that in the first embodiment described above is omitted.

A detection system 2a illustrated in FIG. 16 includes a detection device 1a and a control circuit 7a.

The present embodiment will be described for a configuration in which the processor 50 included in the detection device 1 of the first embodiment is included in the control circuit 7a as a host device at a higher level. In other words, in the detection system 2a illustrated in FIG. 16, the detection controller 11 and the processor 50 are included in the control circuit 7a. The detector 40 is included in a detection circuit 6a.

Figure 17:
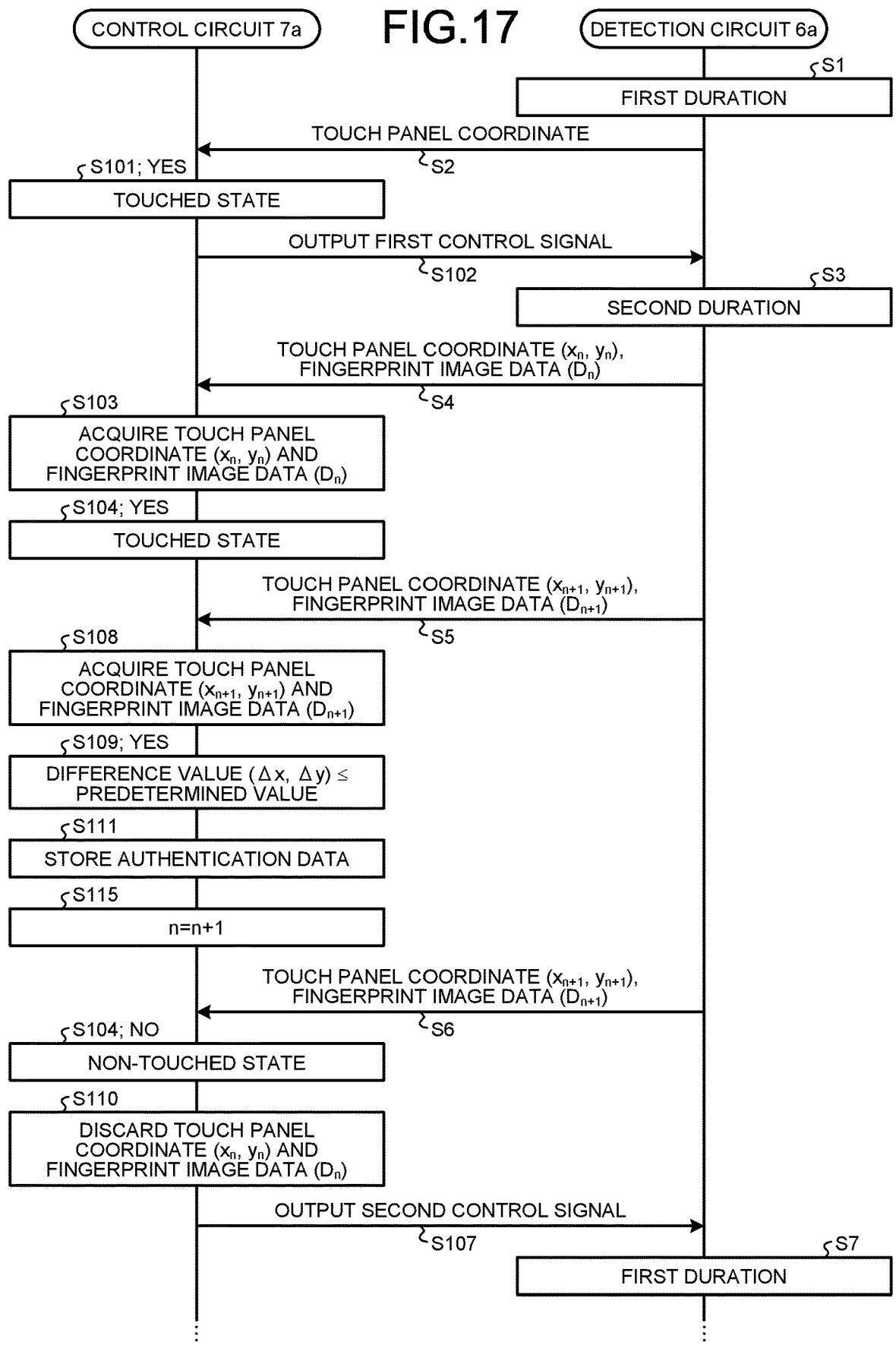
FIG. 17 is a sequence diagram illustrating a specific example of the authentication data acquisition processing in the detection system according to the second embodiment.

The following describes a specific example of the authentication data acquisition processing in the detection system 2a according to the second embodiment with reference to FIG. 17. FIG. 17 is a sequence diagram illustrating the specific example of the authentication data acquisition processing in the detection system according to the second embodiment. The authentication data acquisition processing according to the second embodiment has the same flowchart as in the first embodiment, and thus any duplicate processing thereof will be described with reference to FIG. 14A.

As a precondition of the processing illustrated in FIG. 17, it is assumed that the detection circuit 6a outputs the sensor output Vo to the control circuit 7a. It is also assumed that the authentication data accumulation number m and the authentication data acquisition time (count value) t are reset (m=0 and t=0) at the control circuit 7a.

When the detection circuit 6a is continuously executing touch detection in the first duration (step S1), the control circuit 7a determines whether the current state is a touched state based on a touch panel coordinate acquired in a touch detection duration in the first duration (step S2) (step S101 in FIG. 14A). When having determined that the current state is a touched state (Yes at step S101), the control circuit 7a outputs the first control signal to the detection device 1a (step S102 in FIG. 14A). Accordingly, the detection circuit 6a transitions to the second duration (step S3).

The control circuit 7a receives the sensor output Vo(n) from the detection data generator 49 of the detector 40 and stores, as buffering data in the second storage 52, the touch panel coordinate $(x_n, y_n)$ acquired in the touch detection duration TP(n) in the second duration and the fingerprint image data $(D_n)$ acquired in the fingerprint detection duration FP(n) in the second duration (step S4) (step S103 in FIG. 14A).

The control circuit 7a determines whether the current state is a touched state based on the touch panel coordinate $(x_n, y_n)$ (step S9) (step S104 in FIG. 14A). When having determined that the current state is a touched state (Yes at step S104), the control circuit 7a additionally stores, as buffering data in the second storage 52, the touch panel coordinate $(x_{n+1}, y_{n+1})$ in the touch detection duration TP(n+1) and the fingerprint image data $(D_{n+1})$ in the fingerprint detection duration FP(n+1) (step S4), which are included in the next sensor output Vo(n+1) (step S108 in FIG. 14A).

Subsequently, the control circuit 7a determines whether the difference value $(\Delta x, \Delta y)$ between two consecutive touch panel coordinate stored in the second storage 52, in other words, the touch panel coordinate $(x_n, y_n)$ and the touch panel coordinate $(x_{n+1}, y_{n+1})$ is smaller than the predetermined value (step S109 in FIG. 14A). When the difference value $(\Delta x, \Delta y)$ is smaller than the predetermined value (Yes at step S109), the fingerprint image data $(D_n)$ stored in the second storage 52 is stored as authentication data in the third storage 55 (step S111 in FIG. 14A). The control circuit 7a sets the touch panel coordinate $(x_{n+1}, y_{n+1})$ acquired in the touch detection duration TP(n+1) as the touch panel coordinate $(x_n, y_n)$ acquired in the touch detection duration TP(n) (step S115 in FIG. 14A).

Subsequently, the control circuit 7a determines whether the current state is a touched state based on the touch panel coordinate $(x_{n+1}, y_{n+1})$ acquired in the touch detection duration TP(n+1) in the second duration (step S6) (step S104 in FIG. 14A). When having determined that the current state is a non-touched state (No at step S104), the control circuit 7a discards the touch panel coordinate $(x_n, y_n)$ and the fingerprint image data $(D_n)$ stored in the second storage 52 (step S110) and outputs the second control signal to the detection circuit 6a (step S107 in FIG. 14A). Accordingly, the detection circuit 6a transitions to the first duration (step S7).

In this manner, the control circuit 7a acquires a fingerprint image when the difference value $(\Delta x, \Delta y)$ between the touch panel coordinate $(x_n, y_n)$ as a touch detection coordinate in the touch detection duration TP(n) and the touch panel coordinate $(x_{n+1}, y_{n+1})$ as a touch detection coordinate in the touch detection duration TP(n+1) is smaller than the predetermined value (Yes at step S109) in the second duration. Accordingly, authentication data having a high certainty is obtained.

Figure 18:
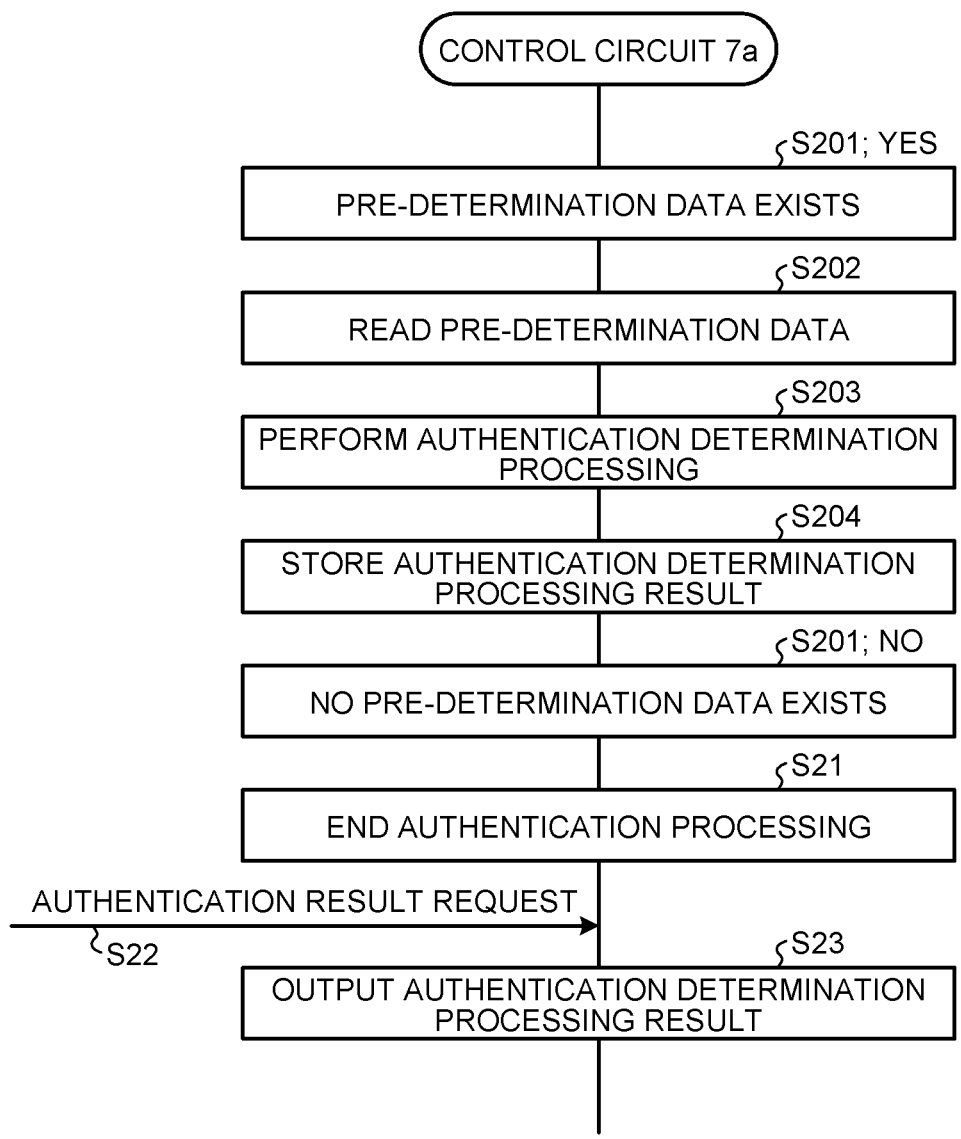
FIG. 18 is a sequence diagram illustrating a specific example of the authentication processing in the detection system according to the second embodiment.

The following describes a specific example of the authentication processing in the detection system 2a according to the second embodiment with reference to FIG. 18. FIG. 18 is a sequence diagram illustrating the specific example of the authentication processing in the detection system according to the second embodiment. The authentication processing according to the second embodiment has the same flowchart as in the first embodiment, and thus any duplicate processing thereof will be described with reference to FIG. 15.

The control circuit 7a determines whether of pre-determination data exists (step S201). When pre-determination data exists (Yes at step S201), the control circuit 7a reads the existing pre-determination data (step S202), executes pre-determined authentication determination processing (step S203), and stores a result of the authentication determination processing (step S204).

Subsequently, the control circuit 7a determines whether pre-determination data exists (step S201). When no pre-determination data exists (No at step S201), the control circuit 7a ends the authentication processing (step S21).

The control circuit 7a responds to an authentication result request (step S22) and outputs the stored authentication determination processing result (step S23). Accordingly, a time loss in response to the authentication result request is reduced.

According to the present embodiment, the detection system 2a that can improve authentication accuracy is obtained.

The second embodiment is described above with the example in which all components of the processor 50 are included in the control circuit 7a, but the present invention is not limited thereto. For example, the control circuit may only include the authentication determiner 54, whereas the touch determiner 51, the second storage 52, the coordinate determiner 53, and the third storage 55 may be included in the detection circuit.

In the second embodiment as well, the above-described authentication data acquisition processing illustrated in FIG. 14B may be executed.

Third Embodiment

Figure 19:
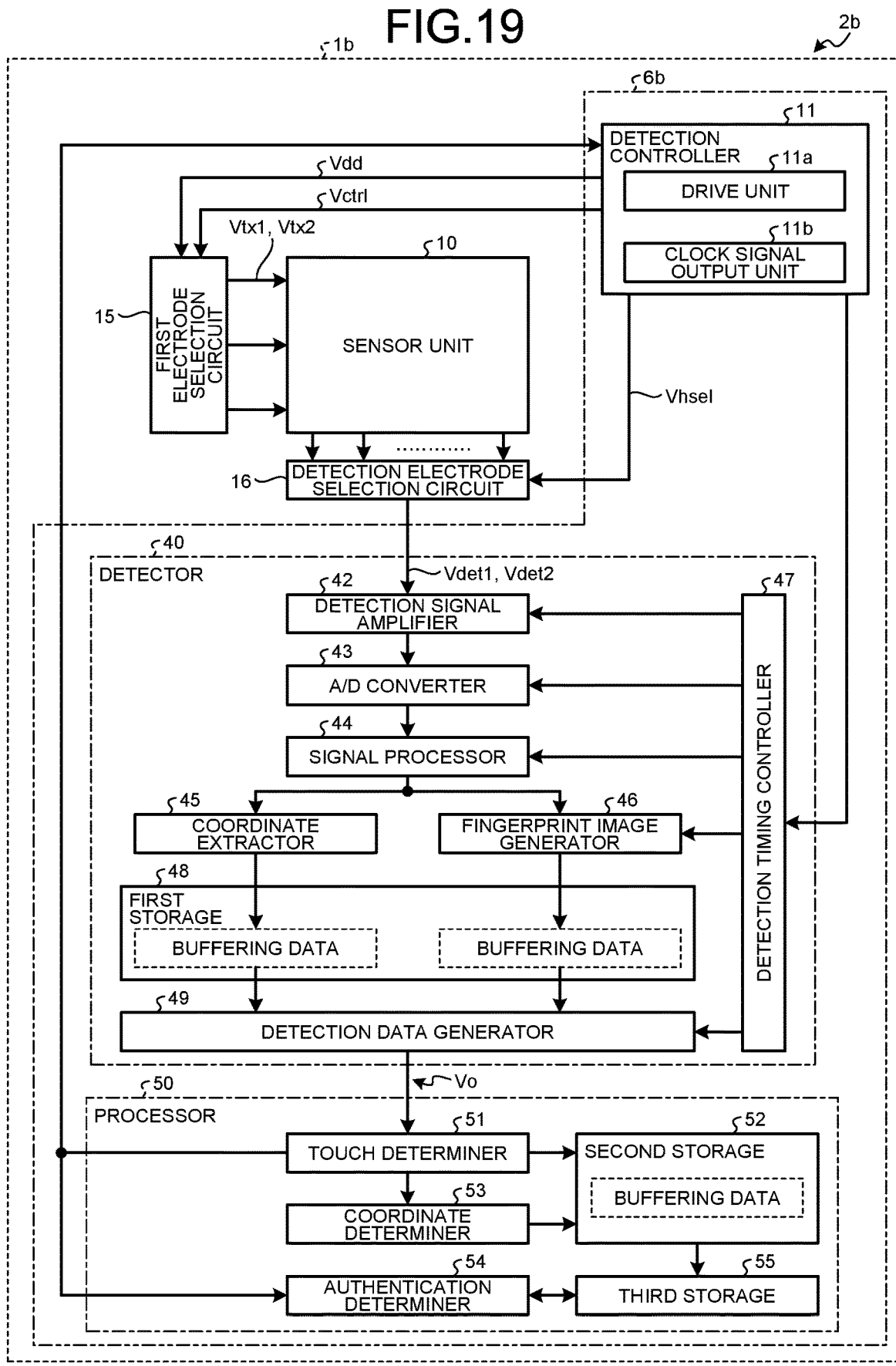
FIG. 19 is a block diagram illustrating an exemplary configuration of a detection system according to a third embodiment.

FIG. 19 is a block diagram illustrating an exemplary configuration of a detection system according to a third embodiment. In this detection system 2b according to the present embodiment, a detection device 1b includes the sensor unit 10, the detection controller 11, the first electrode selection circuit 15, the detection electrode selection circuit 16, the detector 40, the processor 50, and the detection controller 11. The detection controller 11, the detector 40, and the processor 50 are included in a detection circuit 6b.

In the detection system 2b according to the third embodiment illustrated in FIG. 19, an authentication determination processing result in stored in the third storage 55 of the processor 50 is output in accordance with authentication result request from a control device as a host device at a higher level. With this configuration according to the third embodiment, it is possible to obtain the same effects as in the configurations described above in the first and second embodiments.

The embodiments are described above with the configuration including the first storage in which a touch detection coordinate and a fingerprint image are stored as buffering data, the second storage in which a fingerprint image output as the sensor output Vo from the detector is stored as buffering data, and the third storage in which the fingerprint image stored as buffering data in the second storage is stored as authentication data or a result of determination by the authentication determiner is stored, but the configuration of the storages is not limited thereto. For example, the first storage, the second storage, and the third storage may be provided as one storage, and for example, the second storage and the third storage of the processor may be provided as one storage.

In the third embodiment as well, the above-described authentication data acquisition processing illustrated in FIG. 14B may be executed.

Preferable embodiments of the present disclosure are described above, but the present disclosure is not limited to the embodiments. Contents disclosed in the embodiments are merely exemplary, and various kinds of modifications are possible without departing from the scope of the present disclosure. Modifications made as appropriate without departing from the scope of the present disclosure naturally belong to the technical scope of the present disclosure.

What is claimed is:

1. A detection device comprising:
a sensor unit;
a detector configured to receive an output from a sensor;
a detection controller configured to drive and control the sensor unit and the detector; and
a processor configured to perform processing in accordance with an output from the detector, wherein
the detection controller drives the sensor unit and the detector and determines
a touch detection duration in which a coordinate of a finger contacting or nearby the sensor unit is detected, and
a fingerprint detection duration in which a fingerprint image of the finger is detected,
the detector alternately executes detection of the coordinate of the finger in the touch detection duration and detection of the fingerprint image in the fingerprint detection duration, and
the processor
sequentially acquires the coordinate of the finger and the fingerprint image from the detector,
calculates a difference value between the coordinates of the finger that are detected in the touch detection durations before and after the fingerprint detection duration in which each fingerprint image is acquired,
holds the acquired fingerprint image when the difference value is equal to or smaller than a predetermined value, and
discards the acquired fingerprint image when the difference value is larger than the predetermined value.

2. The detection device according to claim 1, wherein
the detection controller drives the sensor unit and the detector and determines
a first duration in which the touch detection durations are continuous, and
a second duration in which the touch detection durations and the fingerprint detection durations are alternately provided, and
the processor
outputs a first control signal for transition to the second duration to the detection controller when the finger is detected in a touch detection duration in the first duration, and
outputs a second control signal for transition to the first duration to the detection controller when the finger is not detected in the touch detection durations in the second duration.

3. The detection device according to claim 2, wherein the processor accumulates, as authentication data in the second duration, fingerprint images acquired in the fingerprint detection duration.

4. The detection device according to claim 3, wherein the processor outputs the second control signal for transition to the first duration to the detector when the number of pieces of the authentication data acquired and accumulated in the second duration has reached a predetermined upper limit.

5. The detection device according to claim 3, wherein the processor outputs the second control signal for transition to the first duration to the detector when an acquisition time of authentication data in the second duration has reached a predetermined upper limit.

6. The detection device according to claim 3, wherein the processor holds, as protect data, the authentication data accumulated in the second duration.

7. A display device comprising:
the detection device according to claim 1; and
a display panel provided with a display region for displaying an image, the display region overlapping a detection region of the detection device.

8. A detection system comprising:
a detection device configured to determine a touch detection duration in which a coordinate of a finger contacting or nearby a sensor unit is detected and a fingerprint detection duration in which a fingerprint of the finger is detected; and a control circuit configured to perform processing in accordance with an output from the detection device, wherein the detection device alternately determines the touch detection durations and the fingerprint detection durations, and the control circuit acquires a fingerprint image in each fingerprint detection duration, calculates a difference value between the coordinates of the finger detected in the touch detection durations before and after the fingerprint detection duration in which the fingerprint image is acquired, holds the acquired fingerprint image when the difference value is equal to or smaller than a predetermined value, and discards the acquired fingerprint image when the difference value is larger than the predetermined value.

9. The detection system according to claim 8, wherein the detection device determines a first duration in which the touch detection durations are continuous and a second duration in which the touch detection durations and the fingerprint detection durations are alternately provided, and the control circuit outputs a first control signal for transition to the second duration to the detection device when the finger is detected in a touch detection duration in the first duration, and outputs a second control signal for transition to the first duration to the detection device when the finger is not detected in the touch detection durations in the second duration.

10. The detection system according to claim 9, wherein the control circuit accumulates, as authentication data in the second duration, fingerprint images acquired in the fingerprint detection duration.

11. The detection system according to claim 10, wherein the control circuit outputs a second control signal for transition to the first duration to the detection device when the number of pieces of the authentication data acquired and accumulated in the second duration has reached a predetermined upper limit.

12. The detection system according to claim 10, wherein the control circuit outputs a second control signal for transition to the first duration to the detection device when an acquisition time of authentication data in the second duration has reached a predetermined upper limit.

13. The detection system according to claim 10, wherein the control circuit holds, as protect data, the authentication data accumulated in the second duration.

14. The detection system according to claim 13, wherein the control circuit performs authentication determination processing of the authentication data held as the protect data and stores a result of the processing for each authentication data.

15. The detection system according to claim 8, further comprising a display panel provided with a display region for displaying an image, the display region overlapping a detection region of the detection device.

16. A detection device comprising:

a sensor unit;

a detector configured to receive an output from a sensor;

a detection controller configured to drive and control the sensor unit and the detector; and a processor configured to perform processing in accordance with an output from the detector, wherein the detection controller drives the sensor unit and the detector and determines a coordinate detection duration in which a coordinate of a detection target body contacting or nearby the sensor unit is detected, and a surface information detection duration in which a concavity-convexity pattern on the surface of the detection target body is detected, the detector alternately executes detection of the coordinate of the detection target body in the coordinate detection duration and detection of the concavity-convexity pattern in the surface information detection duration, and the processor acquires the coordinate of the detection target body and the concavity-convexity pattern from the detector, calculates a difference value between the coordinates of the detection target body detected in the coordinate detection durations before and after the surface information detection duration in which the concavity-convexity pattern is acquired, holds the acquired concavity-convexity pattern when the difference value is equal to or smaller than a predetermined value, and discards the acquired concavity-convexity pattern when the difference value is larger than the predetermined value.

* * * * *